(12) United States Patent
Ooba et al.

(10) Patent No.: US 11,392,338 B2
(45) Date of Patent: Jul. 19, 2022

(54) SHEET INFORMATION CHANGING APPARATUS, METHOD OF CONTROLLING SHEET INFORMATION CHANGING APPARATUS, AND STORAGE MEDIUM FOR CONTROLLING SHEET INFORMATION AND DISPLAYING A CONFIRMING SCREEN

(71) Applicant: CANON KABUSHIKI KAISHA, Tokyo (JP)

(72) Inventors: Hideaki Ooba, Yokohama (JP); Aya Ito, Tokyo (JP); Nobuhiro Kawamura, Nagareyama (JP); Yusuke Kimura, Kokubunji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/779,955

(22) Filed: Feb. 3, 2020

(65) Prior Publication Data

US 2020/0264821 A1 Aug. 20, 2020

(30) Foreign Application Priority Data

Feb. 18, 2019 (JP) .............................. JP2019-026653

(51) Int. Cl.
*G06F 3/12* (2006.01)
(52) U.S. Cl.
CPC .......... *G06F 3/1258* (2013.01); *G06F 3/1219* (2013.01)
(58) Field of Classification Search
CPC ..... G06F 3/1253; G06F 3/1219; G06F 3/1282
See application file for complete search history.

(56) References Cited

U.S. PATENT DOCUMENTS

| 9,477,194 | B2 * | 10/2016 | Adachi | G03G 15/5091 |
|---|---|---|---|---|
| 2004/0141203 | A1 * | 7/2004 | Honma | G06F 3/1253 |
| | | | | 358/1.15 |
| 2007/0263242 | A1 * | 11/2007 | Takahashi | H04N 1/00413 |
| | | | | 358/1.14 |
| 2018/0152572 | A1 * | 5/2018 | Yano | H04N 1/00506 |
| 2019/0009595 | A1 * | 1/2019 | Kawamura | H04N 1/00925 |
| 2019/0037091 | A1 * | 1/2019 | Yamakawa | H04N 1/00779 |

FOREIGN PATENT DOCUMENTS

JP 2017159497 A 9/2017

OTHER PUBLICATIONS

Canon Inc., "Media Librarian," User's Guide, Using Paper Sources, Aug. 2019, pp. 1-3, with English translation.

* cited by examiner

*Primary Examiner* — Benjamin O Dulaney
(74) *Attorney, Agent, or Firm* — Carter, DeLuca & Farrell LLP

(57) ABSTRACT

Provided are a printing control apparatus, a method of controlling a printing control apparatus, and a storage medium capable of simplifying a process of updating information on a paper sheet for a tray for which update of the information is restricted. In a case where update of information on a print medium stored in association with a tray that is provided in an image forming apparatus and holds a print medium is restricted, a user interface is presented which requests to select whether to update the information stored in association with the tray to received update information. Then, the information stored in association with the tray is updated depending on the selection made via the user interface.

10 Claims, 15 Drawing Sheets

TRAY 1 — 150

[ALLOCATE] 156  [UPDATE] 158  [CLOSE] 160  [OTHER INFORMATION] 162

PAPER SHEET INFORMATION — 152

- NAME ▶ CARDBOARD
- BASIS WEIGHT ▶ 300 g/m2
- SIZE ▶ A4
- SURFACE FINISH ▶ HIGH-QUALITY PAPER
- COLOR ▶ WHITE
- SECOND SIDE OF TWO-SIDED PAGE ▶ PRINT IN RED
- GRAIN DIRECTION ▶ INDEFINITE
- TYPE ▶ NORMAL
- CHANGE OF SADDLE STITCH POSITION ▶ 0mm
- IMAGE POSITION ADJUSTMENT ▶ NOT ADJUSTED
- SECONDARY TRANSFER VOLTAGE ADJUSTMENT ▶ NOT ADJUSTED
- CURL CORRECTION ▶ NOT ADJUSTED
- TRAILING END WHITE PATCH CORRECTION ▶ NOT ADJUSTED

164

PAPER SHEET LIST — 154

166 168

| PAPER SHEET NAME | BASIS WEIGHT | SIZE | WIDTH | HEIGHT | SURFACE FINISH | TYPE | COLOR |
|---|---|---|---|---|---|---|---|
| CARDBOARD | 300 | A4 | 29110 | 2100 | HIGH-QUALITY PAPER | NORMAL | WHITE |
| DOUBLE-SIDE COATED PAPER | 105 | A4 | 29110 | 2100 | DOUBLE-SIDE COATED | NORMAL | WHITE |
| ONE-SIDE COATED PAPER | 105 | A4 | 29110 | 2100 | ONE-SIDE COATED | PRE-PUNCHED PAPER | WHITE |
| OHP PAPER | 80 | A4 | 29110 | 2100 | OHP | CHARACTERISTIC | TRANS-PARENT |

SHEET INFORMATION CHANGING APPARATUS, METHOD OF CONTROLLING SHEET INFORMATION CHANGING APPARATUS, AND STORAGE MEDIUM FOR CONTROLLING SHEET INFORMATION AND DISPLAYING A CONFIRMING SCREEN

BACKGROUND OF THE INVENTION

Field of the Invention

The present invention relates to a printing control apparatus that controls printing in an image forming apparatus that forms a predetermined image by printing, a method of controlling a printing control apparatus, and a storage medium.

Description of the Related Art

Production printers for use in commercial printing comprise a plurality of trays that hold various types of paper sheets in order to meet various demands from customers. In such production printers, information on each paper sheet held therein is stored in association with the corresponding tray. During a printing process, the user can store the information on the paper sheet to be used in the next print job in association with a tray that is not used in the current print job, in order to improve the work efficiency.

For such production printing, Japanese Patent Laid-Open No. 2017-159497 discloses a technique of restricting update of information on the paper sheets in a tray that is currently used for printing. Also, a non-patent literature ("Media Librarian User's Guide" by CANON INC. https://oip.manual.canon/USRMA-2993-zz-OP-mlg-jaJP/contents/devu-ope-psourceunit.html#18_h1_01: Japanese version/https://oip.manual.canon/USRMA-2994-zz-OP-mlg-enGB/contents/devu-ope-psourceunit.html#17_h1_01: English version) discloses a technique in which for a tray in association with which information on a paper sheet is stored, update of the information is restricted.

However, in the technique disclosed in Japanese Patent Laid-Open No. 2017-159497, in a case where a plurality of users use a single production printer, the information on a paper sheet stored in association with a tray by one user may be changed by another user while printing is not performed. Also, the technique disclosed in the non-patent literature includes a lock mechanism that restricts update of the information on a paper sheet associated with a tray by selecting a lock button for the tray, but the user needs to select the lock button again to disable the restriction.

Thus, in the technique disclosed in the non-patent literature, in a case where update of the information on a paper sheet stored in association with a tray is restricted, the restriction on update of the information needs to be disabled via the lock button. Then, if a user recognizes that update of information on the paper sheet for a tray is restricted after inputting that information, the user must input the information again after disabling the restriction via the lock button. This makes the work cumbersome.

SUMMARY I/F THE INVENTION

The present invention has been made in view of the above problems and provides a printing control apparatus, a method of controlling a printing control apparatus, and a storage medium that simplify a process of updating information on a paper sheet for a tray for which update of the information is restricted.

In the first aspect of the present invention, there is provided a printing control apparatus for controlling printing in an image forming apparatus, comprising:

a reception unit configured to receive update information for updating information on a print medium stored in association with each of a plurality of trays that are provided in the image forming apparatus and hold print media, and receive an update instruction to update the information stored in association with one of the plurality of trays, the update information being information on a print medium;

an update unit configured to, based on the update instruction, update the information stored in association with the tray to the update information;

a restriction unit configured to restrict update of the information stored in association with the tray by the update unit; and a presenting unit configured to present a first user interface requesting to select whether to update the information stored in association with the tray for which update of the information is restricted by the restriction unit to the update information in a case where the reception unit receives the update information and the update instruction for the tray, wherein the update unit updates the information stored in association with the tray depending on a selection made via the first user interface.

In the second aspect of the present invention, there is provided a method of controlling a printing control apparatus that controls printing in an image forming apparatus while updating information on a print medium stored in association with each of a plurality of trays that are provided in the image forming apparatus and hold print media and restricting update of the information stored in association with the tray, the method comprising:

presenting a user interface requesting to select whether to update the information stored in association with the tray for which update of the information is restricted to update information for updating the information in a case where the update information and an update instruction to update the information to the update information are received for the tray, the update information being information on a print medium; and updating the information stored in association with the tray depending on a selection made via the first user interface.

In the third aspect of the present invention, there is provided a non-transitory computer readable storage medium storing a program for causing a computer to perform a method of controlling a printing control apparatus that controls printing in an image forming apparatus while updating information on a print medium stored in association with each of a plurality of trays that are provided in the image forming apparatus and hold print media and restricting update of the information stored in association with the tray, the method comprising:

presenting a user interface requesting to select whether to update the information stored in association with the tray for which update of the information is restricted to update information for updating the information in a case where the update information and an update instruction to update the information to the update information are received for the tray, the update information being information on a print medium; and updating the information stored in association with the tray depending on a selection made via the first user interface.

According to the present invention, a process of updating information on a print medium stored in association with a tray is simplified.

Further features of the present invention will become apparent from the following description of exemplary embodiments with reference to the attached drawings.

BRIEF DESCRIPTION I/F THE DRAWINGS

FIG. 12 is a diagram of a GUI displayed on an external display apparatus in a second embodiment;

DESCRIPTION I/F THE EMBODIMENTS

Examples of a printing control apparatus, a method of controlling a printing control apparatus, and a storage medium according to the present invention will be described below in detail with reference to the accompanying drawings. First, a first embodiment of the printing control apparatus according to the present invention will be described with reference to FIGS. 1 to 11.

First Embodiment (Configuration of Printing System)

Figure 1:
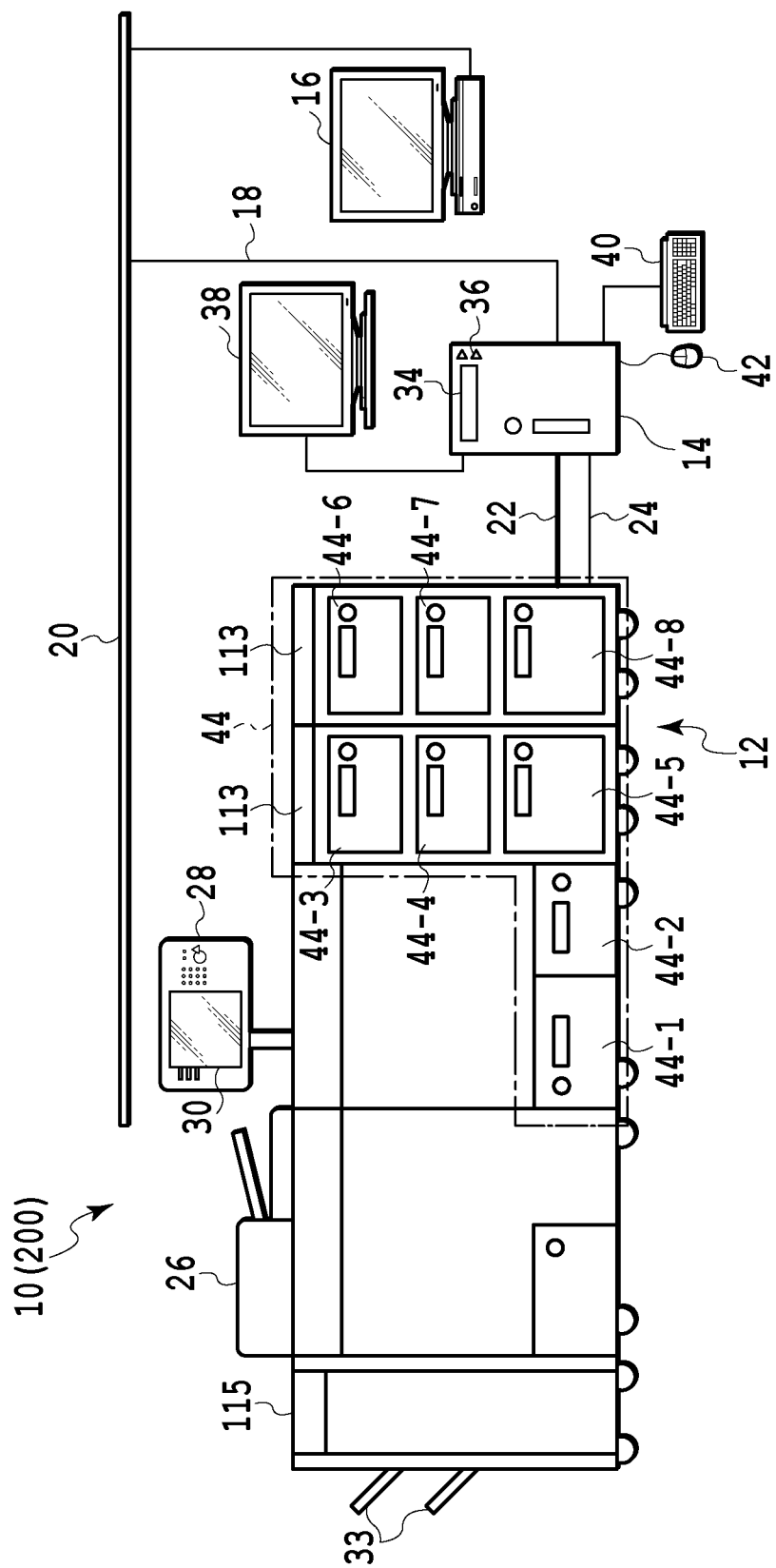
FIG. 1 is a schematic configuration diagram of a printing system comprising a printing control apparatus according to the present invention.

First, the configuration of a printing system comprising the printing control apparatus according to the first embodiment of the present invention will be described with reference to FIG. 1. FIG. 1 is a schematic configuration diagram of the printing system comprising the printing control apparatus according to the first embodiment of the present invention. A printing system 10 comprises an image forming apparatus 12 that forms a desired image on a print medium such as a paper sheet by printing, and a printing control apparatus 14 that controls the printing by the image forming apparatus 12. A client computer 16 is communicatively connected to the printing system 10. Specifically, the client computer 16 is communicatively connected to the printing system 10 via a local area network (LAN) 20 by using an Ethernet (registered trademark) cable 18. Note that the client computer 16 activates an application and performs operations such as instructing the printing system 10 to perform printing.

The image forming apparatus 12 and the printing control apparatus 14 are connected to each other by an image-video cable 22 and a control cable 24. In the present embodiment, the image forming apparatus 12 is not directly connected to the LAN 20. Thus, the image forming apparatus 12 is capable of communicating with the client computer 16 via the printing control apparatus 14. Note that the image forming apparatus 12 may be connected to the LAN 20 and communicatively connected to the client computer 16 via the LAN 20.

The image forming apparatus 12 is a multi-function peripheral equipped with various functions, and is capable of not only performing image processing designated by the client computer 16 or the printing control apparatus 14 but also printing an image based on image information read by a scanner unit 26. The image forming apparatus 12 is also capable of outputting the image information read by the scanner unit 26 to the printing control apparatus 14 and so on. The scanner unit 26 reads a document set in the scanner unit 26 based on an instruction inputted by the user via various keys in an operation unit 28. The operation unit 28 comprises a panel 30 and displays various pieces of information such as a scanning status on the panel 30. The image forming apparatus 12 is also provided with a discharge unit 33 onto which printed paper sheets are discharged and piled.

The image forming apparatus 12 is provided with a plurality of trays 44 holding various types of paper sheets which can be printed by the image forming apparatus 12. In the present embodiment, eight trays 44-1 to 44-8 are provided. Note that in the present embodiment, the print medium on which to form an image by printing is not limited to a paper sheet. Specifically, the print medium may be one capable of receiving ink such as fabric, plastic, film, metallic plate, glass, ceramic, wood material, or leather, for example. In the image forming apparatus 12, the number of trays 44 can be changed by employing optional components such as print-on-demand (POD) decks 113 optionally connectable to the image forming apparatus 12. Each tray 44 is not limited to a cassette form that stores paper sheets to be printed by the image forming apparatus 12, but may be a manual feed tray. Alternatively, the tray 44 may be an inserter that stores paper sheets to be discharged without being printed in the image forming apparatus 12 and inserted between paper sheets printed in the image forming apparatus 12 and discharged therefrom.

Figure 2:
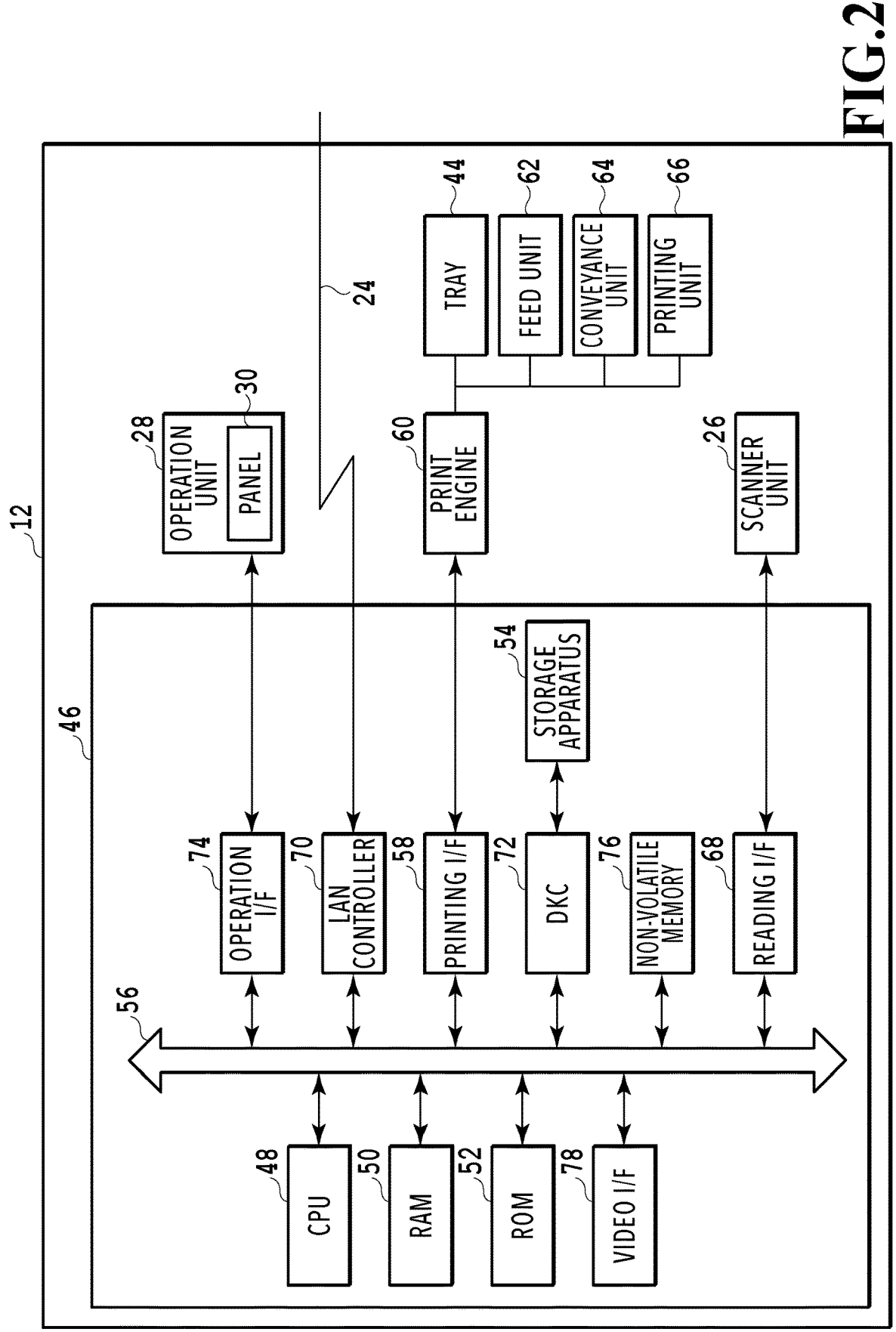
FIG. 2 is a block diagram showing the hardware configuration of an image forming apparatus.

In the image forming apparatus 12, in response to an instruction to start printing, a paper sheet held in the tray 44 designated in a print job is fed by a feed unit 62 (see FIG. 2). The fed paper sheet is conveyed by a conveyance unit 64 (see FIG. 2) to a printing unit 66 (see FIG. 2), printed at the printing unit 66, and discharged onto the discharge unit 33.

The printing control apparatus 14 performs image processing and so on in cooperation with the image forming apparatus 12. The printing control apparatus 14 is provided with a display unit 34 which is capable of displaying information such as an IP address, and operation buttons 36 with which an operation can be executed for a state displayed on the display unit 34. The display unit 34 is capable of displaying items that can be selected by the user. By selecting such an item with the operation buttons 36, the user can perform a power on/off operation, checking of the IP address, and so on, for example.

The printing control apparatus 14 are connected an external display apparatus 38, such as a liquid crystal monitor, a character input device, and a pointing device. In the present embodiment, the character input device is a keyboard 40 and the pointing device is a mouse 42. By using the keyboard 40 and the mouse 42, the user inputs information, instruction, or the like into a screen displayed on the external display apparatus 38. The external display apparatus 38 may be configured to comprise an input apparatus such as a touchpad, for example.

In the present embodiment, the image forming apparatus 12 and the printing control apparatus 14 are configured as separate components in the printing system 10. However, the configuration may be such that the image forming apparatus 12 implements the functions of the printing control apparatus 14, and the image forming apparatus 12 and the printing control apparatus 14 may be configured as a single component.

(Configuration of Image Forming Apparatus)

Next, the hardware configuration of the image forming apparatus 12 will be described. FIG. 2 is a block diagram showing the hardware configuration of the image forming apparatus 12. The image forming apparatus 12 comprises a controller 46 that controls the operation of the whole image forming apparatus 12. The controller 46 comprises a central processing unit (CPU) 48, a ROM 52 that stores programs, various pieces of information, and the like for control by the CPU 48, and a RAM 50 including a storage area to be used as a work area for the CPU 48. The CPU 48 has overall control on access to various devices connected to a system bus 56 based on programs stored in the ROM 52 and a storage apparatus 54.

The CPU 48 is connected to a print engine 60 via a print interface (I/F) 58. The print engine 60 is connected to the trays 44, which hold paper sheets, the feed unit 62, which feeds a paper sheet held in a tray 44, the conveyance unit 64, which conveys the fed paper sheet, and the printing unit 66, which performs printing on the conveyed paper sheet. The CPU 48 controls the trays 44, the feed unit 62, the conveyance unit 64, and the printing unit 66, which are connected to the print engine 60 via the print I/F 58, and obtains their statuses. Specifically, the controller 46 executes printing in the image forming apparatus 12 by controlling the feed unit 62, the conveyance unit 64, and the printing unit 66 via the print engine 60 based on a print job.

The CPU 48 is connected to the scanner unit 26 via a reading I/F 68. The scanner unit 26 is controlled by the CPU 48, and image information read by the scanner unit 26 is stored in the storage apparatus 54 or the like, for example. Also, the CPU 48 is capable of communicating with the printing control apparatus 14 via a LAN controller 70 and the control cable 24.

The CPU 48 is connected to the storage apparatus 54 via a disk controller (DKC) 72. A hard disk drive (HDD), an IC card, or the like can be used as the storage apparatus 54. The DKC 72 controls access to the storage apparatus 54. The storage apparatus 54 stores an application program, font data, form data, and so on and also is used as a job storage area for temporarily spooling a print job and externally controlling the spooled print job. Also, in the case where an optional component such as the POD deck 113 is connected to the image forming apparatus 12, the storage apparatus 54 stores information on the hardware configuration of the connected optional component. The storage apparatus 54 is also used as a BOX data storage area for performing printing that retains image information read by the scanner unit 26 and the image information of a print job as BOX data and can be referred to via the network. Meanwhile, in the present embodiment, a HDD is used as the storage apparatus 54, and it retains various logs such as a job log and an image log.

The CPU 48 is connected to the operation unit 28 via an operation I/F 74. The CPU 48 generates images to be displayed on the panel 30 of the operation unit 28. The operation unit 28 is provided with hardware keys that can be pressed by the user as well as the panel 30. The user can input various pieces of information into the controller 46 with these hardware keys, software keys displayed on the panel 30, or the like.

A non-volatile memory 76 is connected to the CPU 48, and the CPU 48 stores various pieces of information inputted from terminals via the operation I/F 74, the network, and so on into the non-volatile memory 76. Also, a video I/F 78 connected to the image-video cable 22 is connected to the CPU 48. The CPU 48 receives image information outputted from the printing control apparatus 14 via the video I/F 78 and the image-video cable 22.

(Functional Configuration of Controller 46)

Figure 3:
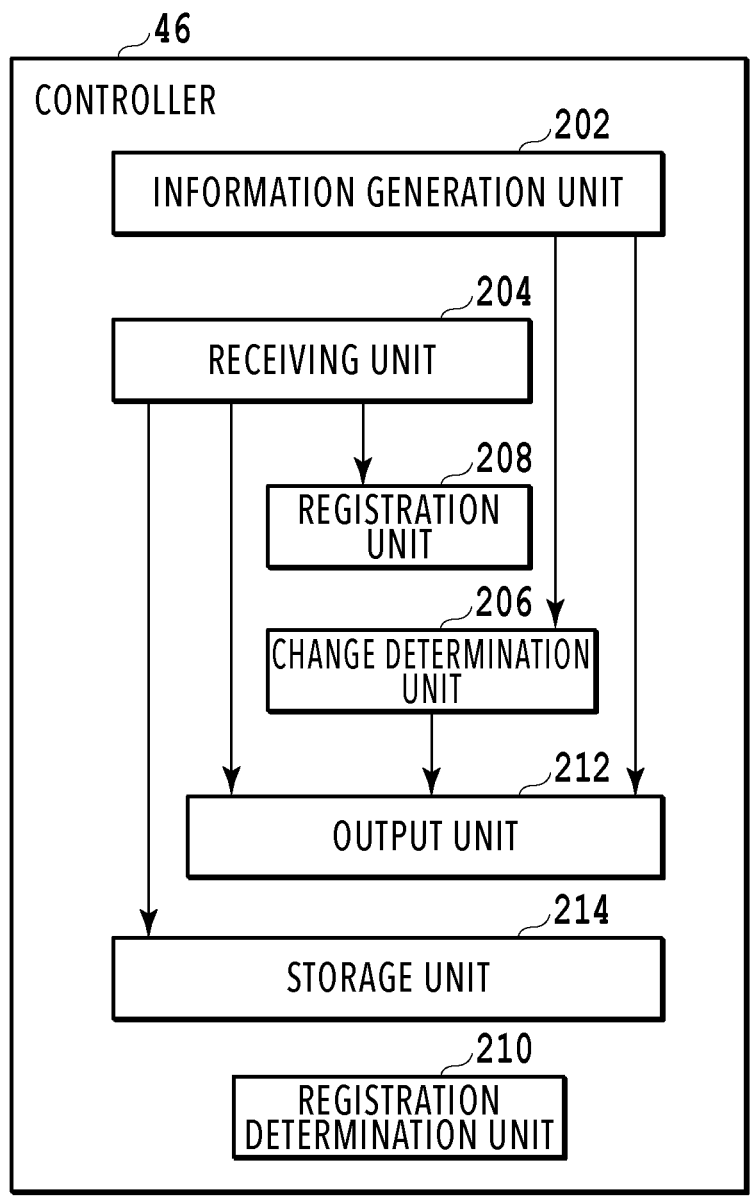
FIG. 3 is a block diagram showing the functional configuration of a controller in the image forming apparatus.

Next, the functional configuration of the controller 46 will be described. FIG. 3 is a block diagram showing the functional configuration of the controller 46. Note that the CPU 48 executes a process at each component shown in FIG. 3 by, for example, deploying a program stored in the ROM 52 to the RAM 50 and executing it. Also, the controller 46 is equipped with various publicly known functions, but FIG. 3 shows characteristic components for implementing the invention of the present application.

The controller 46 comprises an information generation unit 202 that generates pieces of information on the image forming apparatus 12. The information generation unit 202 obtains model information, option information, tray information, paper sheet list information, and adjustment value information on the image forming apparatus 12 from the storage apparatus 54 as pieces of information on the image forming apparatus 12, and generates the obtained pieces of information as pieces of information that can be outputted to the printing control apparatus 14. Note that the model information, the option information, the tray information, the paper sheet list information, and the adjustment value information will be described later. The controller 46 also comprises a receiving unit 204 that receives various pieces of information outputted from the printing control apparatus 14. The receiving unit 204 receives, for example, queries for the pieces of information on the image forming apparatus 12, an output instruction to output any piece of information on the image forming apparatus 12 that has been changed to the printing control apparatus 14, and so on.

The controller 46 comprises a change determination unit 206 that determines whether any piece of information on the image forming apparatus 12 has been changed. The controller 46 further comprises a registration unit 208 that, in a case where the receiving unit 204 receives an output instruction, registers the printing control apparatus 14 in an output destination list in which is registered a target(s) to which, in a case where any piece of information on the image forming apparatus 12 has been changed, the changed piece of information (changed information) is outputted. The controller 46 also comprises a registration determination unit 210 that determines whether the printing control apparatus 14 is registered in the output destination list, and an output unit 212 that outputs the pieces of information on the image forming apparatus 12 generated by the information generation unit 202 to the printing control apparatus 14.

The controller 46 comprises a storage unit 214 that updates information on a paper sheet stored in association with a tray 44 (hereinafter referred to as "paper sheet information") to paper sheet information inputted from the printing control apparatus 14 (update information) and stores it. In other words, the storage unit 214 functions as an update unit that updates the paper sheet information stored in association with a tray 44. Note that in the description of the present application, storing paper sheet information in association with a tray 44 will also be expressed as setting paper sheet information for a tray 44. The storage unit 214 also stores lock information set for each tray 44. The lock information is information on whether update of the paper sheet information stored in association with the tray 44 is restricted. The storage unit 214 stores the paper sheet information and the lock information as tray information on the tray 44 in the storage apparatus 54, for example.

(Configuration of Printing Control Apparatus)

Figure 4:
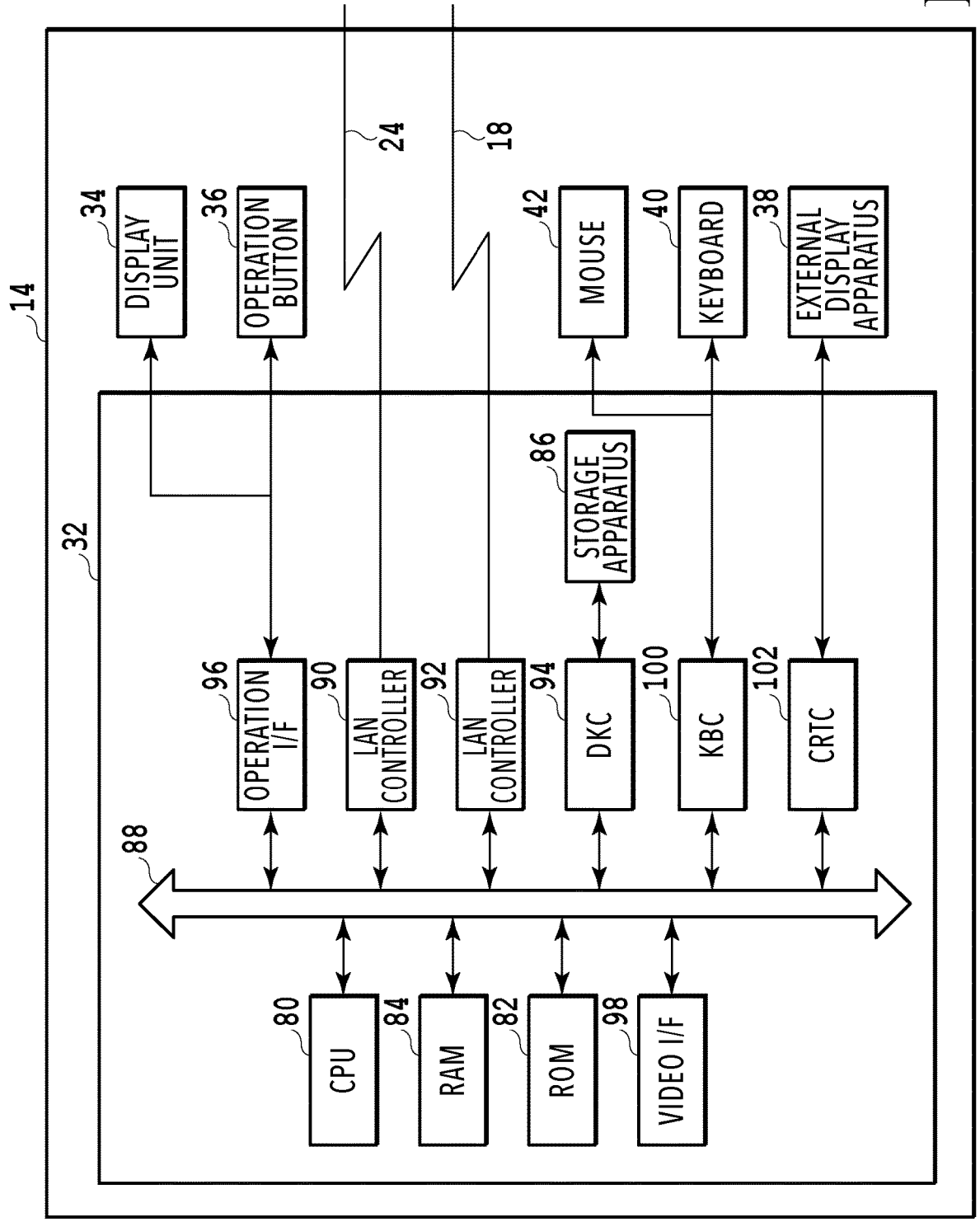
FIG. 4 is a block diagram showing the hardware configuration of the printing control apparatus.

Next, the hardware configuration of the printing control apparatus 14 will be described. FIG. 4 is a block diagram showing the hardware configuration of the printing control apparatus 14. The printing control apparatus 14 comprises a controller 32 that controls the operation of the whole printing control apparatus 14. The controller 32 comprises a CPU 80, a ROM 82 that stores programs, various pieces of data, and the like for control by the CPU 80, and a RAM 84 including a storage area to be used as a work area for the CPU 80. The CPU 80 has overall control on access to various devices connected to a system bus 88 based on programs stored in the ROM 82 and a storage apparatus 86.

The CPU 80 is capable of communicating with the image forming apparatus 12 via a LAN controller 90 and the control cable 24. The CPU 80 is also capable of communicating with the client computer 16 on the network via a LAN controller 92 and the Ethernet (registered trademark) cable 18, which is connected to the LAN 20.

The CPU 80 is connected to the storage apparatus 86 via a DKC 94. A HDD, an IC card, or the like can be used as the storage apparatus 86. The DKC 94 controls access to the storage apparatus 86. The storage apparatus 86 stores an application program, font data, form data, and so on and also temporarily spools a print job. The spooled print job is processed by a raster image processor (RIP) and then stored in the storage apparatus 86 again.

The CPU 80 is connected to the operation buttons 36 and the display unit 34 via an operation I/F 96. Various pieces of information are displayed on the display unit 34 under control of the CPU 80. Also, information such as an instruction from the user is inputted into the CPU 80 via the operation buttons 36. Also, a video I/F 98 to which the image-video cable 22 is connected is connected to the CPU 80. The CPU 80 outputs image data having undergone RIP processing to the image forming apparatus 12 via the video I/F 98 and the image-video cable 22.

The CPU 80 is connected to the keyboard 40 and the mouse 42 via a keyboard controller (KBC) 100. Thus, the user can input various pieces of information to the controller 32 with the keyboard 40 and the mouse 42. The CPU 80 is also connected to the external display apparatus 38 via a display control unit (Cathode Ray Tube Controller: CRTC) 102. The CRTC 102 incorporates a video memory (not shown), draws image data in this video memory based on an instruction from the CPU 80, and outputs the drawn image data to the external display apparatus 38.

(Functional Configuration of Controller 32)

Figure 5:
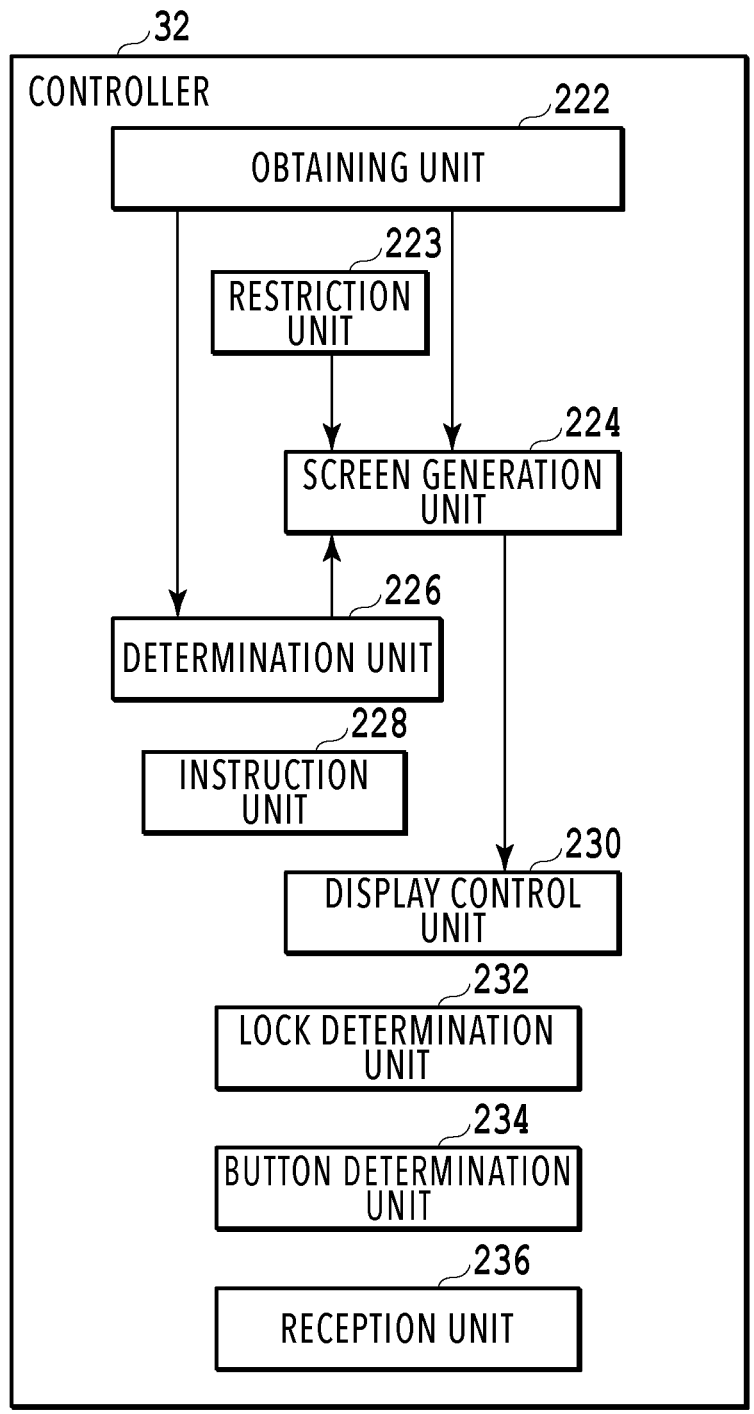
FIG. 5 is a block diagram showing the functional configuration of a controller in the printing control apparatus.

Next, the functional configuration of the controller 32 will be described. FIG. 5 is a block diagram showing the functional configuration of the controller 32. Note that the CPU 80 executes a process at each component shown in FIG. 5 by, for example, deploying a program stored in the ROM 82 to the RAM 84 and executing it. Also, the controller 32 is equipped with various publicly known functions, but FIG. 5 shows characteristic components for implementing the invention of the present application.

The controller 32 comprises an obtaining unit 222 that obtains the pieces of information on the image forming apparatus 12. The obtaining unit 222 outputs a query for a predetermined piece of information on the image forming apparatus 12 to be obtained to the image forming apparatus 12, and obtains the predetermined piece of information outputted from the image forming apparatus 12 in response to this query. In a case where any piece of information on the image forming apparatus 12 is changed, the image forming apparatus 12 outputs the changed piece of information on the image forming apparatus 12, or the changed information, to the printing control apparatus 14. The obtaining unit 222 also obtain the changed information outputted from the image forming apparatus 12. The controller 32 also comprises a restriction unit 223 that restricts update of the paper sheet information stored in association with a tray button 118 (the tray 44 corresponding to the tray button 118) or disables the update restriction based on input information inputted by the user.

The controller 32 comprises a screen generation unit 224 that generates screens to be displayed on the external display apparatus 38 based on the pieces of information on the image forming apparatus 12 obtained by the obtaining unit 222 and so on. Also, the controller 32 comprises a determination unit 226 that determines whether any piece of information on the image forming apparatus 12 has been changed based on the changed information obtained by the obtaining unit 222. Further, the controller 32 comprises an instruction unit 228 that instructs the image forming apparatus 12 to, in a case where any piece of information on the image forming apparatus 12 is changed, output the changed information to the printing control apparatus 14. Furthermore, the controller 32 comprises a display control unit 230 that controls the screens to be displayed on the external display apparatus 38.

The controller 32 comprises a lock determination unit 232 that determines based on the lock information whether the tray 44 is in a locked state where update of the paper sheet information stored in association with the tray 44 is restricted. The controller 32 also comprises a button determination unit 234 that determines which button is selected by the user among the plurality of buttons provided in a dialogue 142 (see FIG. 11) displayed on the external display apparatus 38. The controller 32 further comprises a reception unit 236 that, in a case where update information being paper sheet information for updating the paper sheet information associated with (set for) a tray 44 is inputted via a screen displayed on the external display apparatus 38, receives the update information. The reception unit 236 receives an update instruction to update the paper sheet information in a case where a predetermined process is executed in the input of the update information.

(Screens Displayed on External Display Apparatus)

Figure 6A:
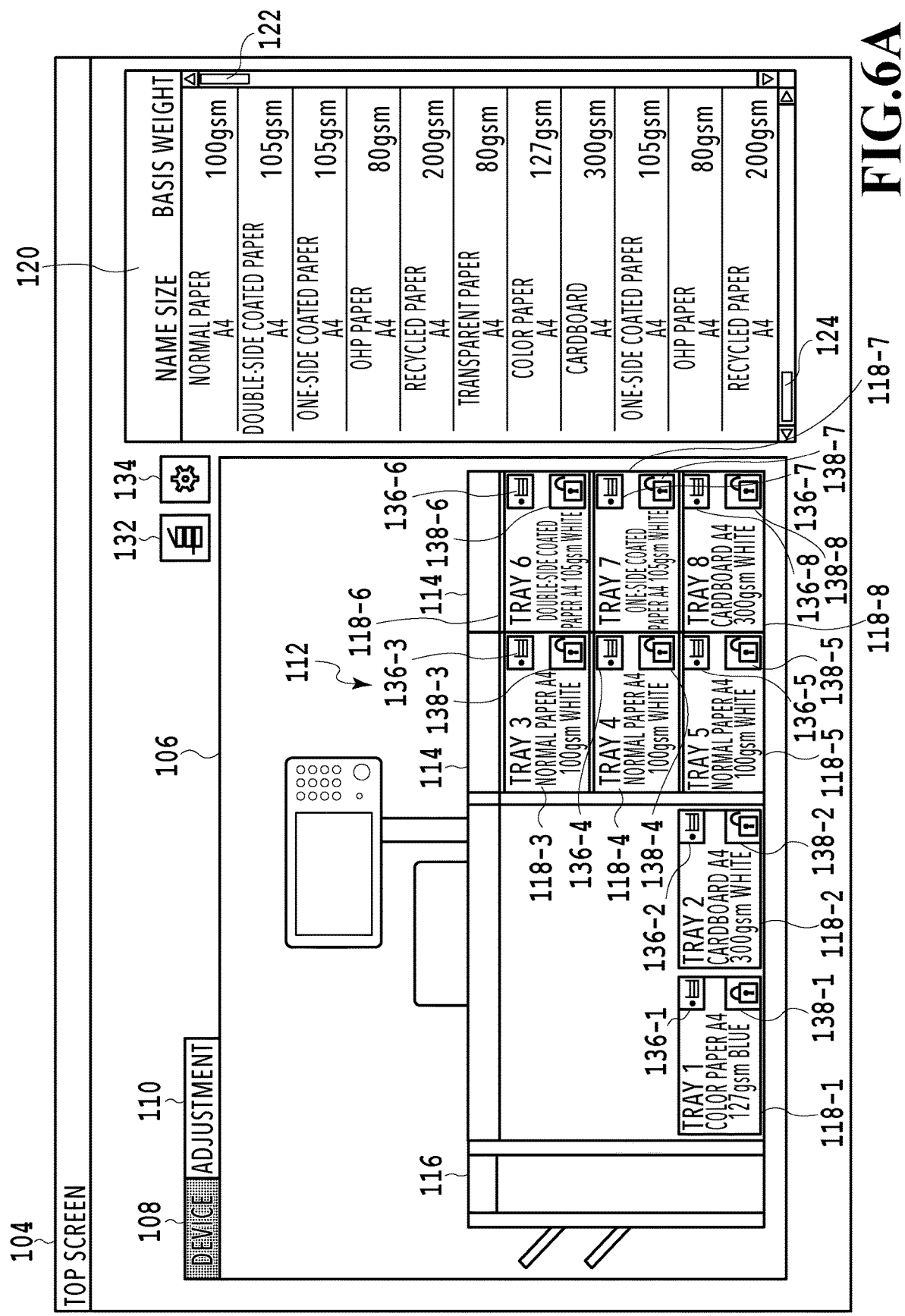
FIGS. 6A and 6B are diagrams of GUIs displayed on an external display apparatus in a first embodiment.
Figure 6B:
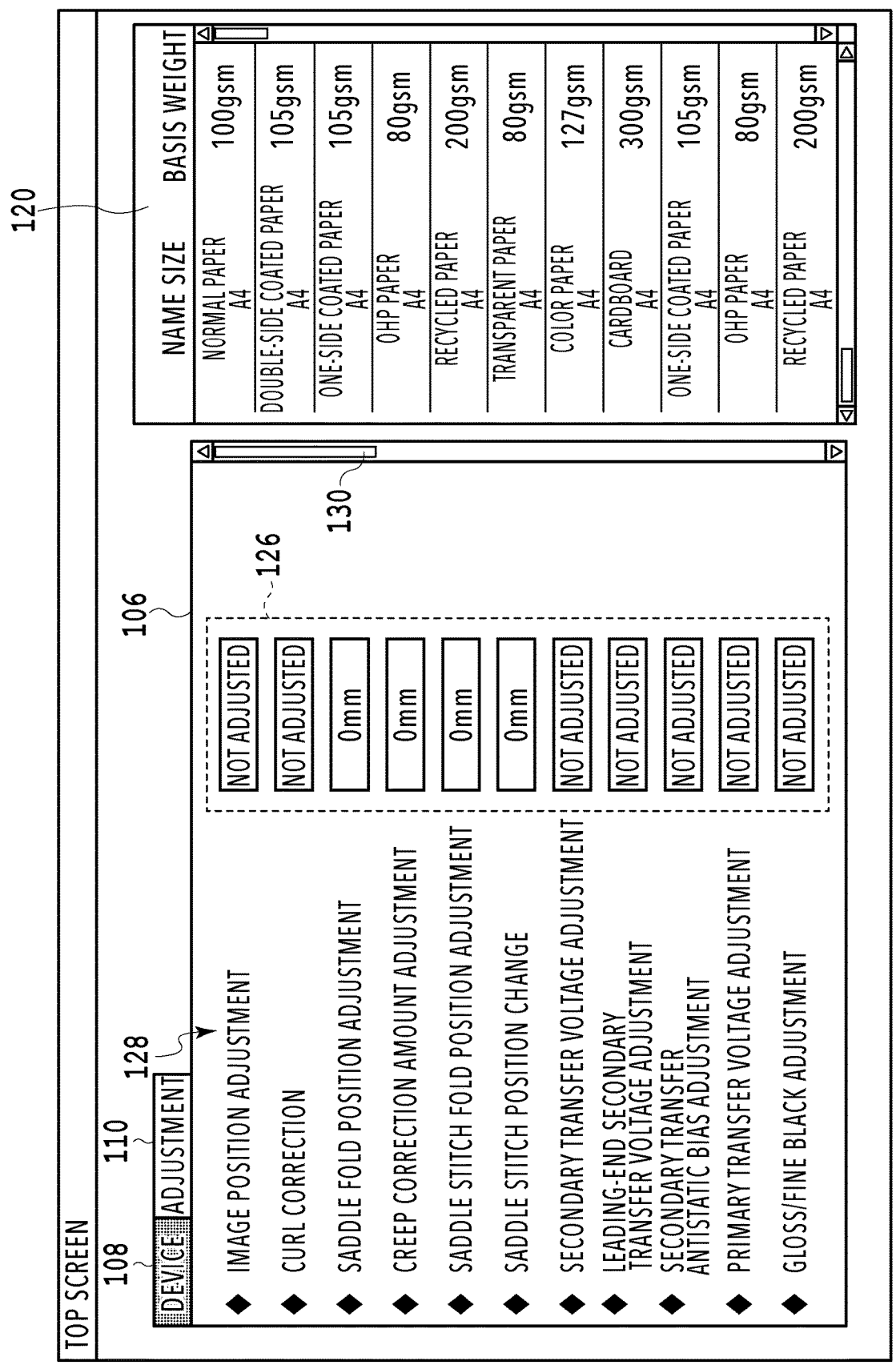

Next, a description will be given of screens for inputting paper sheet information which are displayed upon activation of a paper sheet management application. The paper sheet management application operates in the printing control apparatus 14. Each of FIGS. 6A and 6B is a diagram showing a graphical user interface (GUI) displayed on the external display apparatus 38 upon activation of the paper sheet management application. FIG. 6A is a diagram showing a state where a device screen 112 is displayed in a display screen 104. FIG. 6B is a diagram showing a state where a setting screen 128 is displayed in the display screen 104. The display screen 104 upon activation of the paper sheet management application is displayed on the external display apparatus 38 based on image data outputted from the CRTC 102. This image data is drawn in the video memory of the CRTC 102 in accordance with an instruction from the CPU 80 (display control unit 230). The drawn image data is then outputted as a video signal to the external display apparatus 38 via the video I/F 98.

The display screen 104 is a screen for inputting update information being paper sheet information for updating the paper sheet information stored in association with a tray 44. The display screen 104 is provided with a display area 106 whose display content can be change via tab control. With a device tab 108 selected, the display area 106 displays the device screen 112, which reflects the hardware configuration of the image forming apparatus 12. Also, with an adjustment tab 110 selected, the display area 106 displays the setting screen 128, which displays various adjustment items that are adjustable (described later) and setting buttons 126 corresponding to them. The user can selectively display the device screen 112 or the setting screen 128 in the display area 106 by selecting the device tab 108 or the adjustment tab 110 with the mouse 42 or the like.

In a case where the device tab 108 is selected, the display area 106 displays the device screen 112, showing the hardware configuration of the image forming apparatus 12 connected to the printing control apparatus 14 at the time of the selection of the device tab 108, as shown in FIG. 6A. With this device screen 112, the user can recognize the state of connection of any optional component to the image forming apparatus 12. The optional component refers to a hardware component such as the POD deck 113 (see FIG. 1) that can be optionally added to the basic hardware configuration of the image forming apparatus 12.

Upon activation of the paper sheet management application, the printing control apparatus 14 obtains information on the hardware configuration of the image forming apparatus 12 (hereinafter referred to as "hardware information" as appropriate) based on the model information and the option information. Then, based on the obtained hardware information, the printing control apparatus 14 displays the device screen 112 in the display area 106, showing the hardware configuration of the image forming apparatus 12 connected to the printing control apparatus 14 at the time of the activation of the application. The model information is information for determining the model (type) of the image forming apparatus 12 and includes hardware information on the configuration of the image forming apparatus 12 of the model, for example. Also, the option information is hardware information on the optional component. The model information and the option information include tray information on each tray 44 as a hardware component. The tray information includes information on the configuration such as whether the tray 44 is an optional deck tray, a manual feed tray, or a long paper sheet tray (configuration information), and the paper sheet information stored in association with the tray 44.

In the present embodiment, as shown in FIG. 1, the POD decks 113, each including three trays 44, are connected in series to the image forming apparatus 12, and a finisher 115 is also connected to the image forming apparatus 12. Thus, the image forming apparatus 12 comprises eight trays 44-1 to 44-8, including the trays 44 in the POD decks 113. In this case, as shown in FIG. 6A, the device screen 112 in the display area 106 displays POD deck images 114 of the POD decks 113 and a finisher image 116 of the finisher 115. Also, the device screen 112 displays the tray buttons 118 respectively corresponding to the trays 44 at positions corresponding to the trays 44.

In a case where the adjustment tab 110 is selected, the display area 106 displays the setting screen 128, displaying the adjustment items and the setting buttons 126 corresponding to them, as shown in FIG. 6B. For the image forming apparatus 12, properties of the image forming apparatus 12 that affect printing on a paper sheet and so on are adjusted, and the adjusted information is stored as paper sheet information in association with the corresponding tray 44. Examples of the adjustment items include image position adjustment for setting adjustment of the paper sheet position, curl correction for setting curl correction, saddle fold position adjustment for adjusting the saddle fold position, and so on. For the paper sheet position adjustment and the like, "ADJUSTED" is displayed on the corresponding setting buttons 126 in a case where these adjustment items have already been adjusted, and "NOT ADJUSTED" is displayed on the setting buttons 126 in a case where the adjustment items have not been adjusted. Also, for the curl correction, the saddle fold position adjustment, and the like, set adjustment values are displayed on the corresponding setting buttons 126 in mm, for example. The adjustment items are displayed next to one another in the height direction, and the setting buttons 126 are disposed next to the respective adjustment items in the width direction. Thus, in a case where the user wishes to display an adjustment item not displayed in the setting screen 128, the user operates a slider bar 130 to scroll the setting screen 128 in the height direction.

The display screen 104 is provided with a list screen 120 that displays a list of attribute information that can be stored in association with a tray 44 as paper sheet information. The attribute information is information on attributes of a paper sheet such as the name, basis weight, and surface finish of the paper sheet. In the list screen 120, paper sheet types are displayed next to one another in the height direction, and the pieces of attribute information on each paper sheet are displayed next to one another in the width direction. Thus, in a case where the user wishes to display a paper sheet not displayed in the list screen 120, the user operates a slider bar 122 to scroll the setting screen 120 in the height direction. Also, in a case where the user wishes to display a piece of attribute information not displayed in the list screen 120, the user operates a slider bar 124 to scroll the list screen 120 in the width direction.

The display screen 104 is provided with an allocation button 132 for allocating paper sheet information (attribute information) to each of the tray buttons 118-1 to 118-8, as shown in FIG. 6A. In a case where the allocation button 132 is selected with a desired paper sheet selected in the list screen 120, the tray button 118 corresponding to the tray 44 in association with which the paper sheet information on the selected paper sheet can be stored is changed from its normal state and displayed highlighted. With the tray button 118 displayed highlighted, the user can easily recognize the tray 44 to which the selected paper sheet information can be allocated. Note that the display screen 104 is provided with a setting button 134 for opening a screen (not shown) for configuring various settings of the paper sheet management application, as shown in FIG. 6A.

The tray buttons 118-1 to 118-8 are provided with open buttons 136-1 to 136-8 capable of physically opening the trays 44-1 to 44-8, respectively. The open buttons 136-1 to 136-8 are associated with the trays 44 in the image forming apparatus 12, like the tray buttons 118. Selecting any one of the open buttons 136-1 to 136-8 outputs open information for opening the corresponding tray 44 to the image forming apparatus 12 via the control cable 24. Based on this open information, the image forming apparatus 12 opens the target tray 44 via the print engine 60.

The tray buttons 118-1 to 118-8 are also provided with lock buttons 138-1 to 138-8 capable of restricting update of the paper sheet information stored in association with the trays 44, respectively. Note that in the following description, "update of the paper sheet information stored in association with a tray 44" will be simply expressed as "update of the paper sheet information" as appropriate. The paper sheet information associated with a tray 44 in the state where update of the paper sheet information is restricted, i.e., the locked state, cannot be easily changed. On the other hand, the paper sheet information associated with a tray 44 in the state where the restriction on update of the paper sheet information is disabled, i.e., an unlocked state, can be easily changed. In the present embodiment, to restrict update of the paper sheet information is to insert a step of having the user select whether to update the paper sheet information before updating the paper sheet information.

The image of each of the lock buttons 138-1 to 138-8 displayed in the device screen 112 in the locked state and the image displayed in the unlocked state are different. In FIG. 6A, the lock button 138-1 is in the locked state while the lock buttons 138-2 to 138-8 are in the unlocked state. Selecting a lock button in the unlocked state changes the display of the lock button to the locked state. In this case, the restriction unit 223 sets lock information representing the locked state for the tray button 118 in which the lock button is located. Selecting a lock button in the locked state changes the display of the lock button to the unlocked state. In this case, the restriction unit 223 sets lock information representing the unlocked state for the tray button 118 in which the lock button is located.

Figure 7:
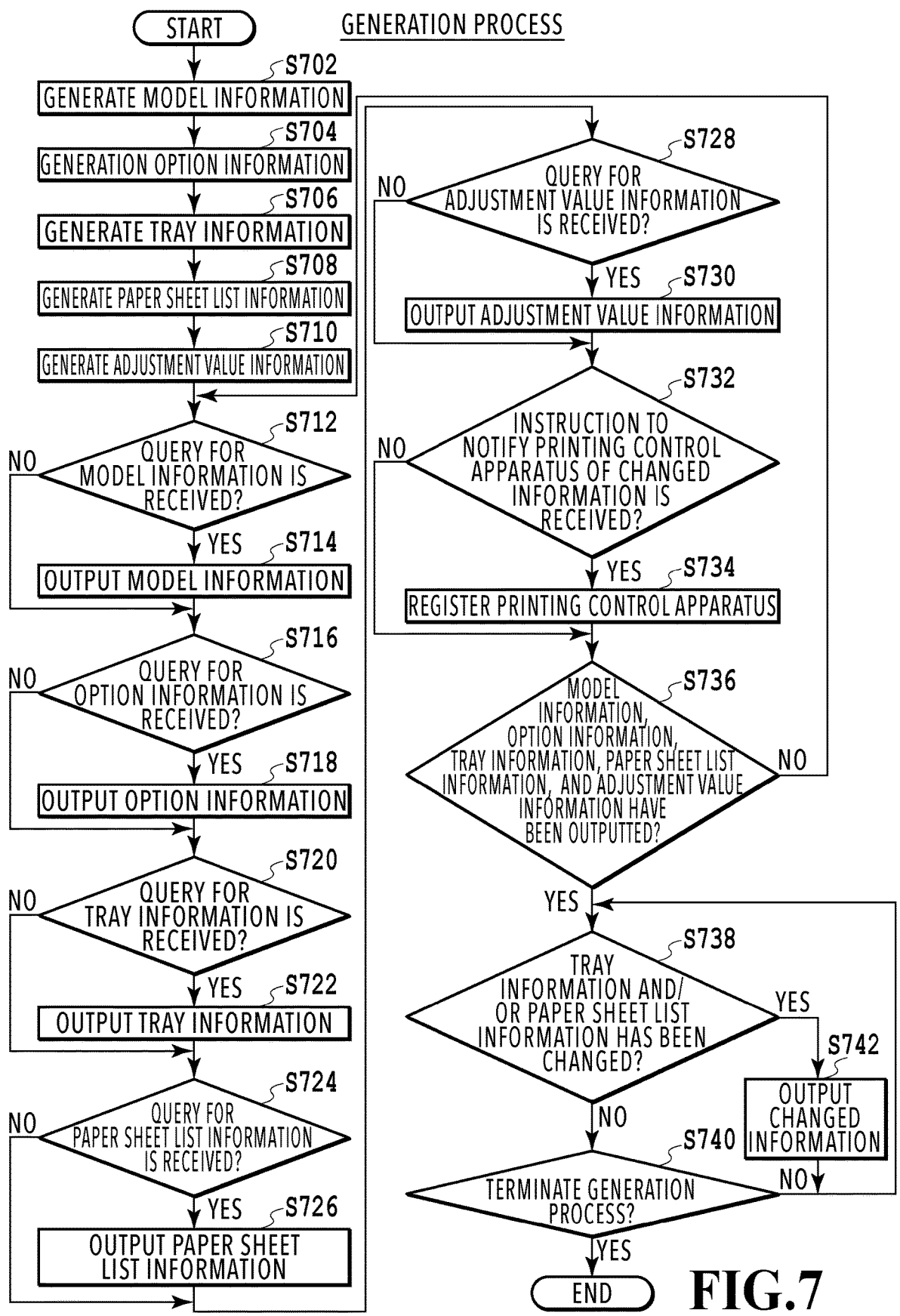
FIG. 7 is a flowchart showing a process routine for a generation process of generating pieces of information on an image forming apparatus that can be outputted.

Next, a display process of displaying the display screen 104 on the external display apparatus 38 will be described. The display process uses pieces of information on the image forming apparatus 12 generated in a generation process executed upon activation of the image forming apparatus 12. First, the generation process of generating various pieces of information on the image forming apparatus 12 which can be outputted to the printing control apparatus 14 will be described with reference to FIG. 7. FIG. 7 is a flowchart showing a detailed process content of the generation process.

The image forming apparatus 12 starts the generation process upon activation. The CPU 48 executes the series of processes shown in the flowchart of the generation process by deploying a program stored in the storage apparatus 54 (or the ROM 52) to the RAM 50 and executing it. Alternatively, the functions of some or all of the steps in FIG. 7 may be implemented with hardware such as an ASIC or an electronic circuit.

Upon start of the generation process, firstly, the information generation unit 202 obtains the model information on the image forming apparatus 12 stored in the storage apparatus 54 and generates model information that can be outputted to the printing control apparatus 14 from the obtained model information (S702). Also, the information generation unit 202 obtains the option information on the image forming apparatus 12 stored in the storage apparatus 54 and generates option information that can be outputted to the printing control apparatus 14 from the obtained option information (S704).

Then, the information generation unit 202 obtains the tray information on each tray 44 from the model information obtained in S702 and the option information obtained in S704, and generates tray information that can be outputted to the printing control apparatus 14 from the obtained tray information (S706). Note that although the tray information is contained in the model information and the option information and the tray information is obtained from the model information and the option information in the present embodiment, the present embodiment is not limited to this method. Specifically, the tray information may be stored in the storage apparatus 54.

Also, the information generation unit 202 obtains the paper sheet list information stored in the storage apparatus 54 and generates paper sheet list information that can be outputted to the printing control apparatus 14 from the obtained paper sheet list information (S708). The paper sheet list information is information on a list of paper sheets usable in the image forming apparatus 12, i.e., information on a list of paper sheet attribute information that can be stored in association with the trays 44.

The information generation unit 202 further obtains the adjustment value information stored in the storage apparatus 54 and generates adjustment value information that can be outputted to the printing control apparatus 14 from the obtained adjustment value information (S710). The adjustment value information is information on the adjustment items of the image forming apparatus 12 that are adjustable and the adjustment values set for the respective adjustment items. Note that the adjustment value information may be only the adjustment values for preset adjustment items.

After the generation of the model information, the option information, the tray information, the paper sheet list information, and the adjustment value information that can be outputted to the printing control apparatus 14, it is determined whether the receiving unit 204 has received a query for the model information from the printing control apparatus 14 (S712). If it is determined in S712 that no query has been received for the model information, the processing proceeds to S716 to be described below. On the other hand, if it is determined in S712 that a query for the model information has been received, the output unit 212 outputs the generated model information to the printing control apparatus 14 (S714), and the processing then proceeds to S716.

In S716, it is determined whether the receiving unit 204 has received a query for the option information from the printing control apparatus 14. If it is determined in S716 that no query has been received for the option information, the processing proceeds to S720 to be described below. On the other hand, if it is determined in S716 that a query for the option information has been received, the output unit 212 outputs the generated option information to the printing control apparatus 14 (S718), and the processing then proceeds to S720.

In S720, it is determined whether the receiving unit 204 has received a query for the tray information from the printing control apparatus 14. If it is determined in S720 that no query has been received for the tray information, the processing proceeds to S724 to be described below. On the other hand, if it is determined in S720 that a query for the tray information has been received, the output unit 212 outputs the generated tray information to the printing control apparatus 14 (S722), and the processing then proceeds to S724.

In S724, it is determined whether the receiving unit 204 has received a query for the paper sheet list information from the printing control apparatus 14. If it is determined in S724 that no query has been received for the paper sheet list information, the processing proceeds to S728 to be described below. On the other hand, if it is determined in S724 that a query for the paper sheet list information has been received, the output unit 212 outputs the generated paper sheet list information to the printing control apparatus 14 (S726), and the processing then proceeds to S728.

In S728, it is determined whether the receiving unit 204 has received a query for the adjustment value information from the printing control apparatus 14. If it is determined in S728 that no query has been received for the adjustment value information, the processing proceeds to S732 to be described below. On the other hand, if it is determined in S728 that a query for the adjustment value information has been received, the output unit 212 outputs the generated adjustment value information to the printing control apparatus 14 (S730), and the processing then proceeds to S732.

In S732, it is determined whether the receiving unit 204 has received an output instruction from the printing control apparatus 14. In the display process, in a case where any piece of information on the image forming apparatus 12 is changed, an output instruction to output the changed information to the printing control apparatus 14 is outputted from the printing control apparatus 14 to the image forming apparatus 12 in order to reflect each piece of information on the image forming apparatus 12 in real time. If it is determined in S732 that no output instruction has been received, the processing proceeds to S736 to be described below. On the other hand, if it is determined in S732 that an output instruction has been received, the registration unit 208 registers the printing control apparatus 14 in the output destination list stored in the storage apparatus 54, and the processing then proceeds to S736.

In S736, it is determined whether the output unit 212 has outputted the generated model information, option information, tray information, paper sheet list information, and adjustment value information. If it is determined in S736 that at least one of the model information, the option information, the tray information, the paper sheet list information, and the adjustment value information has not been outputted, the processing returns to S712 and the processes in S712 and the subsequent steps are executed. On the other hand, if it is determined in S736 that the model information, the option information, the tray information, the paper sheet list information, and the adjustment value information have been outputted, the change determination unit 206 determines whether pieces of information on the image forming apparatus 12 has been changed (S738). Here, the registration determination unit 210 also determines whether the printing control apparatus 14 has been registered in the output destination list. The image forming apparatus 12 is configured to, for example, obtain the pieces of information on the image forming apparatus 12 after being activated, and then repetitively obtain the pieces of information on the image forming apparatus 12 at intervals of a predetermined period of time. Thus, the change determination unit 206 determines that a piece of information has been changed in a case where the newly obtained piece of information and the last obtained piece of information do not match each other.

In the present embodiment, it is determined in S738 whether the tray information and the paper sheet list information have been changed. Note that the pieces of information on the image forming apparatus 12 to be subjected to the determination of change may include the model information, the option information, and the adjustment value information. If it is determined in S738 that none of the tray information and the paper sheet list information has been changed or at least one of them has been changed but the printing control apparatus 14 has not been registered in the output destination list, whether to terminate the generation process is determined (S740). In S740, it is determined whether the power of the image forming apparatus 12 is turned off. If the power is determined to be turned off, it is determined that the generation process is to be terminated. If the power is determined to be not turned off, it is determined that the generation process is not to be terminated. If it is determined in S740 that the generation process is to be terminated, the generation process is terminated. If it is determined in S740 that the generation process is not to be terminated, the processing returns to S738.

On the other hand, if it is determined in S738 that at least one of the tray information and the paper sheet list information has been changed and the printing control apparatus 14 has been registered in the output destination list, the output unit 212 outputs the changed information, and the processing returns to S738. Note that the outputted changed information has been generated by the information generation unit 202 as information that can be outputted to the printing control apparatus 14.

Figure 8:
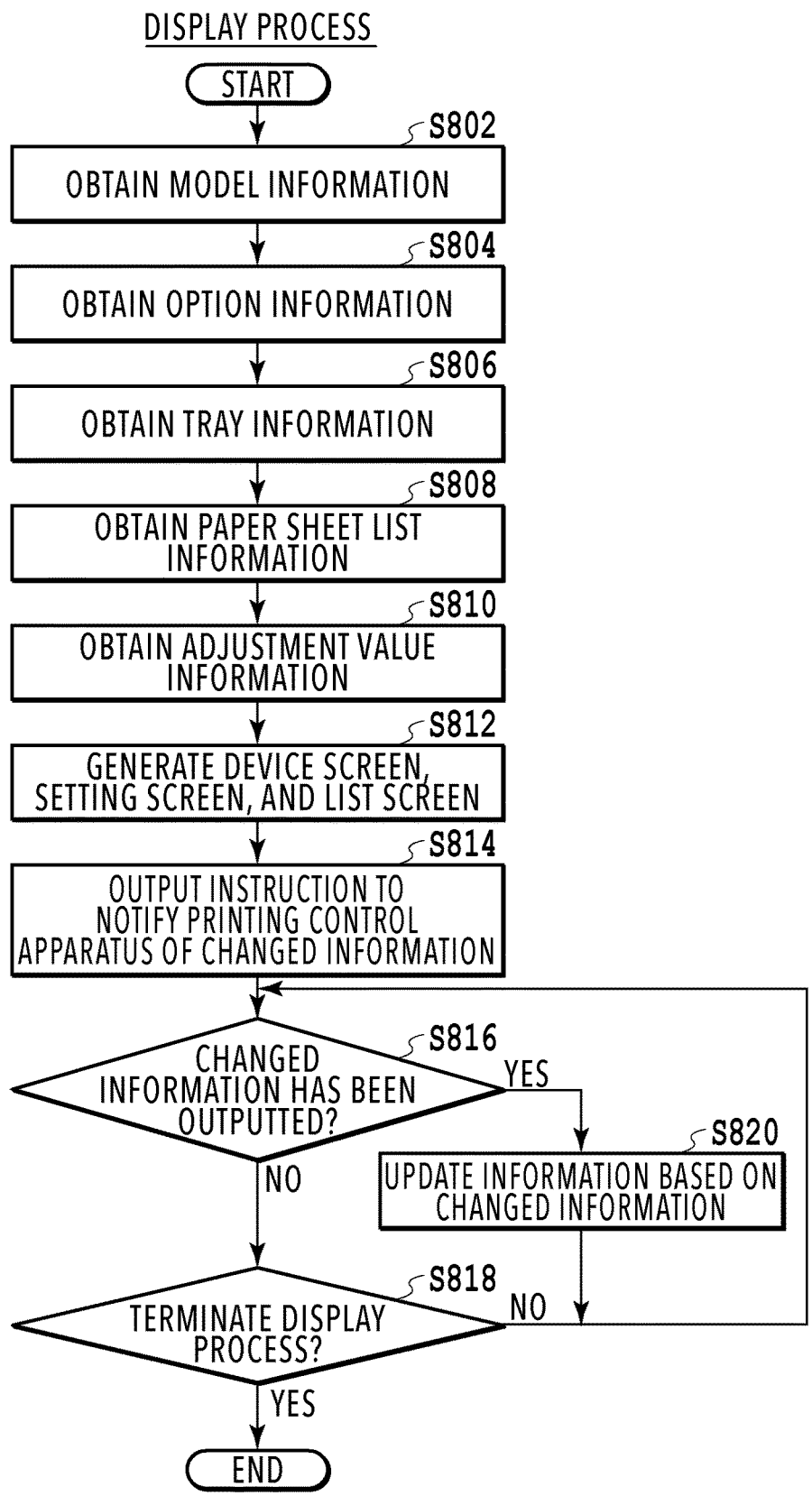
FIG. 8 is a flowchart showing a process routine for a display process of displaying screens on the external display apparatus.
Figure 9:
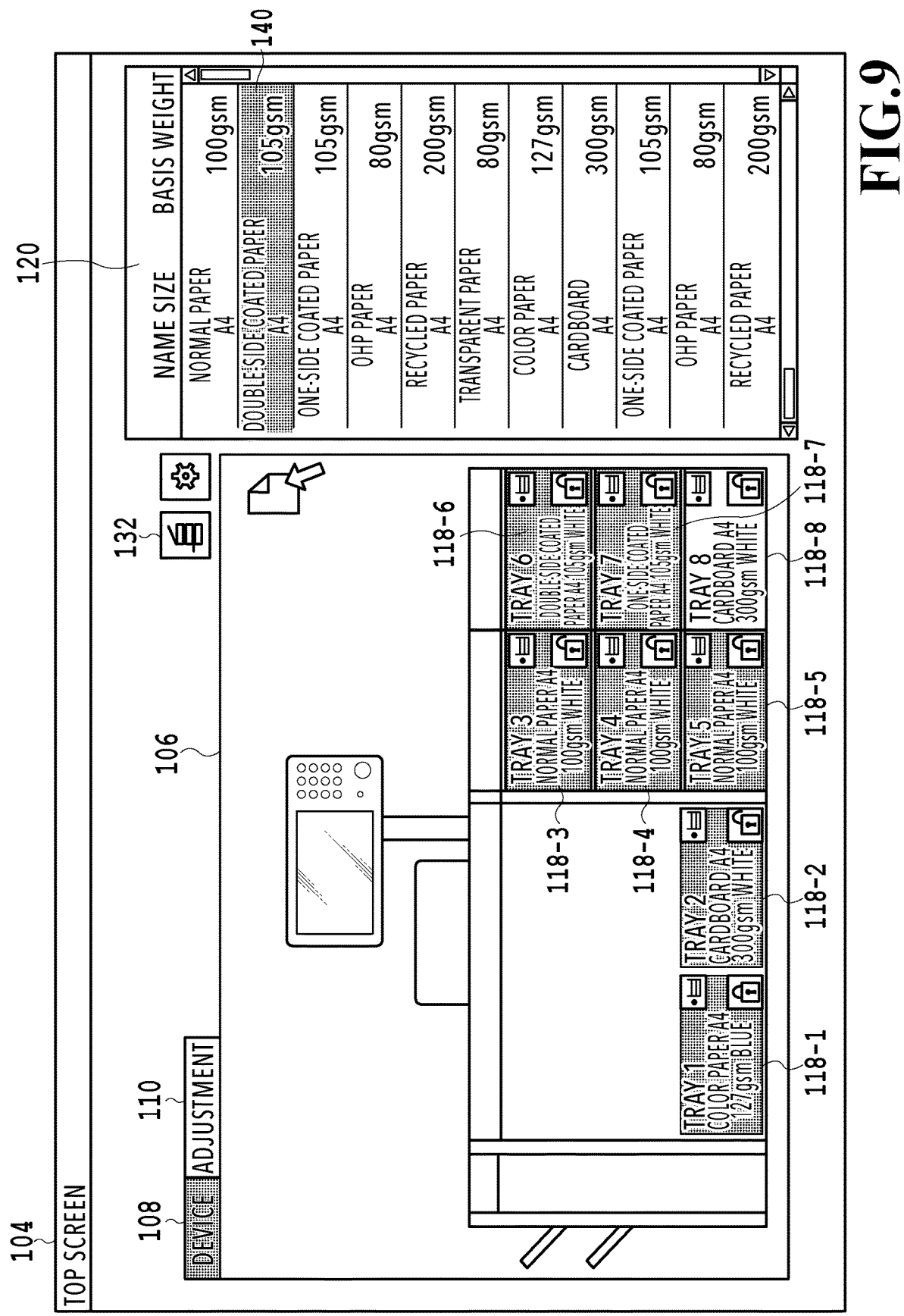
FIG. 9 is a diagram showing a display screen for inputting paper sheet information.

The display process of displaying predetermined screens on the external display apparatus 38 is started upon activation of the paper sheet management application in the printing control apparatus 14 connected to the image forming apparatus 12 in the state where the pieces of information on the image forming apparatus 12 have been generated as described above by the generation process after the activation of the image forming apparatus 12. FIG. 8 is a flowchart showing a detailed process content of the display process. The CPU 80 executes the series of processes shown in the flowchart of the display process by deploying a program stored in the storage apparatus 86 (or the ROM 82) to the RAM 84 and executing it. Alternatively, the functions of some or all of the steps in FIG. 8 may be implemented with hardware such as an ASIC or an electronic circuit.

Upon start of the display process, firstly, the obtaining unit 222 obtains the model information on the image forming apparatus 12, which is connected to the printing control apparatus 14 (S802). Specifically, in S802, the obtaining unit 222 outputs a query for the model information to the image forming apparatus 12 and obtains the model information outputted from the image forming apparatus 12 as a response.

Then, the obtaining unit 222 obtains the option information on the image forming apparatus 12, which is connected to the printing control apparatus 14 (S804). Also, the obtaining unit 222 obtains the tray information on the image forming apparatus 12, which is connected to the printing control apparatus 14 (S806). Further, the obtaining unit 222 obtains the paper sheet list information on the image forming apparatus 12, which is connected to the printing control apparatus 14 (S808). Furthermore, the obtaining unit 222 obtains the adjustment value information on the image forming apparatus 12, which is connected to the printing control apparatus 14 (S810). Specifically, in S804, S806, S808, and S810, the obtaining unit 222 outputs a query for the information to be obtained to the image forming apparatus 12 and obtains the information outputted from the image forming apparatus 12 based on the query.

Then, the screen generation unit 224 generates the device screen 112, the setting screen 128, and the list screen 120 based on the obtained model information, option information, tray information, paper sheet list information, and adjustment value information (S812). Note that the generated screens are displayed as the display screen 104 on the external display apparatus 38 by the display control unit 230. Specifically, a configuration image of the image forming apparatus 12 in the device screen 112 is generated based on the hardware information contained in the model information and the option information. Also, the tray buttons 118-1 to 118-8 are generated on the configuration image based on the tray information obtained in S806. Further, the paper sheet information stored in association with each tray 44 is displayed on the corresponding one of the tray buttons 118-1 to 118-8 based on the tray information. The tray information contains remote openability information indicating whether the trays 44 are openable from the printing control apparatus 14, and the open buttons 136-1 to 136-8 are generated based on this remote openability information. The tray information also contains the lock information on the trays 44, and the lock buttons 138-1 to 138-8 are generated based on this lock information. Also, the list screen 120 is generated based on the paper sheet list information. In the list screen 120, sets of attribute information are displayed and, for each set, information indicating whether the set can be stored in association with a tray(s) 44 is displayed based on settability information contained in the sheet list information. Also, the setting screen 128 is generated based on the adjustment value information. Specifically, the adjustment items are displayed and also character strings are displayed on the setting buttons 126 corresponding to the adjustment items. In the displaying of the character strings on the setting buttons 126, in a case where there is a single adjustment value, that value is displayed whereas "ADJUSTED" or "NOT ADJUSTED" is displayed in a case where there are two or more adjustment values.

After the generation of the device screen 112, the setting screen 128, and the list screen 120, the instruction unit 228 outputs an output instruction to output changed information (a piece(s) of information on the image forming apparatus 12 that has been changed) to the printing control apparatus 14 to the image forming apparatus 12 (S814). Then, the determination unit 226 determines whether changed information has been outputted (S816). Specifically, in S816, the determination unit 226 determines whether the obtaining unit 222 has obtained changed information. If it is determined in S816 that no changed information has been outputted, whether to terminate the display process is determined (S818). In S818, it is determined that the display process is to be terminated if the paper sheet management application is terminated, whereas it is determined the display process is not to be terminated if the paper sheet management application is not terminated. If it is determined in S818 that the display process is to be terminated, the display process is terminated. If it is determined in S818 that the display process is not to be terminated, the processing returns to S816. On the other hand, if it is determined in S816 that changed information has been outputted, the screen generation unit 224 updates the image displayed in the display screen 104 based on the changed information (S820), and the processing returns to S816.

In the above description, the generation process is executed to generate the pieces of information on the image forming apparatus 12 that can be outputted to the printing control apparatus 14, and then the paper sheet management application is activated to execute the display process. Note, however, that the procedure is not limited to this. Specifically, the generation process and the display process may be executed in parallel.

(Update of Paper Sheet Information)

Next, a description will be given of a case of updating the paper sheet information stored in association with a tray 44 by utilizing the display screen 104. As for the adjustment items, the setting screen 128 is displayed, and adjustment values are inputted for given items. Also, as for the attribute information, firstly, the user selects a desired set of attribute information in the list screen 120 in the display screen 104 by utilizing the mouse 42. In the list screen 120, an area 140 where the selected set of attribute information is displayed is displayed highlighted (see FIG. 9). Then, the user selects the allocation button 132. As a result, each tray button 118 in association with which the selected set of attribute information in the list screen 120 can be stored is displayed highlighted. Note that the configuration may be such that simply selecting a set of attribute information in the list screen 120 highlights each tray button 118 in association with which the selected set of attribute information can be stored. Then, with the mouse 42, the set of attribute information in the selected state is dragged over and dropped on any one of the tray buttons 118 in association with which the set of attribute information can be stored. As a result, the selected set of attribute information in the list screen 120 is allocated to the tray button 118 on which it was dropped.

Figure 10:
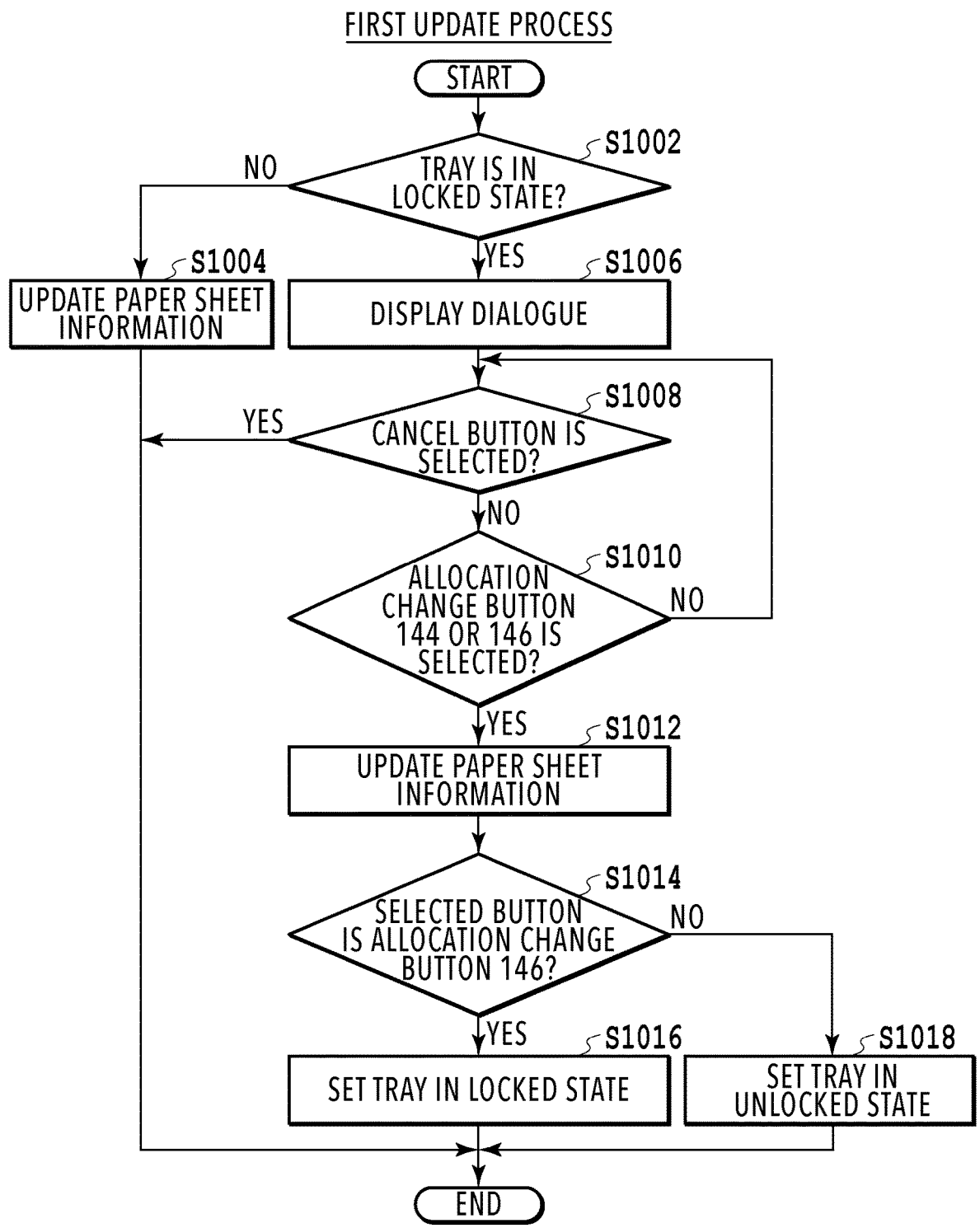
FIG. 10 is a flowchart showing a process routine for a first update process of updating the paper sheet information.

After the user inputs adjustment values for the adjustment items and allocates paper sheet information to the tray button 118 in the display screen 104, the reception unit 236 receives an update instruction to update the paper sheet information associated with the tray 44. Also, for the inputted paper sheet information, the reception unit 236 receives update information being paper sheet information for updating the paper sheet information stored in association with the tray 44. Then, a first update process of updating the paper sheet information stored in association with the tray 44 to the update information is started. FIG. 10 is a flowchart showing a detailed process content of the first update process. The CPU 80 executes the series of processes shown in the flowchart of the first update process by deploying a program stored in the storage apparatus 86 (or the ROM 82) to the RAM 84 and executing it. Alternatively, the functions of some or all of the steps in FIG. 10 may be implemented with hardware such as an ASIC or an electronic circuit.

Upon start of the first update process, firstly, the lock determination unit 232 determines whether the tray 44 corresponding to the tray button 118 to which the new paper sheet information has been allocated is in the locked state (S1002). If it is determined in S1002 that the tray 44 corresponding to the tray button 118 to which the new paper sheet information has been allocated is not in the locked state, the paper sheet information stored in association with the tray 44 is updated to the update information (S1004). The first update process is then terminated. Specifically, in S1004, the update information received by the reception unit 236 is outputted to the image forming apparatus 12. Here, information identifying the tray 44 to be subjected to the update of the paper sheet information associated therewith is also outputted. Upon input of these pieces of information to the image forming apparatus 12, the storage unit 214 in the image forming apparatus 12 identifies the tray 44 whose paper sheet information is to be updated based on the inputted pieces of information. Then, the storage unit 214 updates the paper sheet information stored in association with the identified tray 44 to the update information.

If it is determined in S1002 that the tray 44 corresponding to the tray button 118 to which the new paper sheet information has been allocated is in the locked state, the display control unit 230 displays the dialogue 142 on the external display apparatus 38 (S1006). The dialogue 142 is a graphical user interface for having the user select whether to update the paper sheet information stored in association with the tray 44 to the update information.

Figure 11:
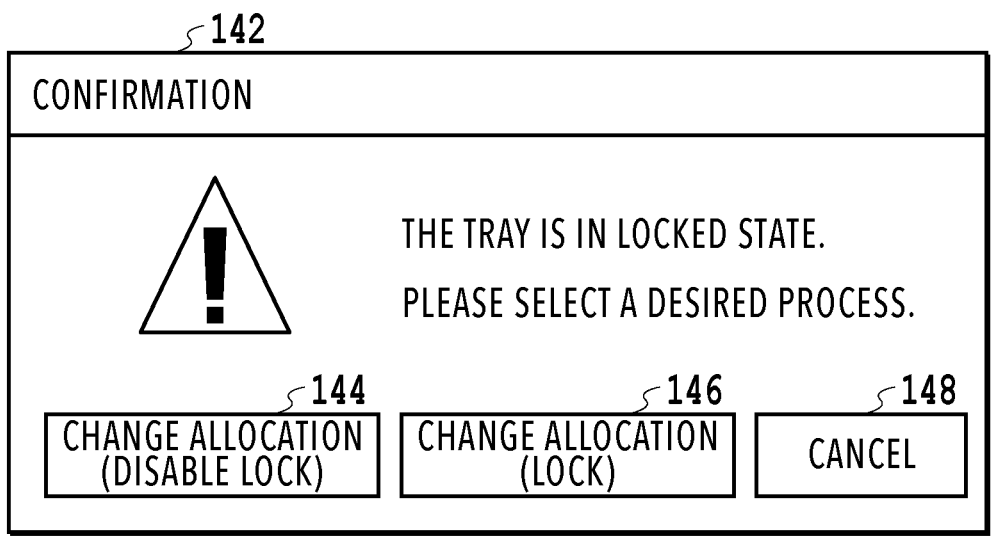
FIG. 11 is a diagram showing a dialogue.

FIG. 11 is a diagram showing an example of the dialogue 142 displayed in S1006. The dialogue 142 (first user interface) displays a message indicating that the tray 44 corresponding to the tray button 118 to which the new paper sheet information has been allocated is in the locked state. Moreover, the dialogue 142 displays allocation change buttons 144 and 146 and a cancel button 148 and also a message prompting the user to select one of these buttons. In a case where the allocation change button 144 is selected, the paper sheet information stored in association with the tray 44 is updated to the update information although the tray 44 is in the locked state, and thereafter the tray 44 is set in the unlocked state. Also, in a case where the allocation change button 146 is selected, the paper sheet information stored in association with the tray 44 is updated to the update information although the tray 44 is in the locked state, and thereafter the tray 44 is maintained in the locked state. Further, in a case where the cancel button 148 is selected, the new paper sheet information is not stored in association with the tray 44, and the tray 44 is maintained in the locked state. In other words, the update of the paper sheet information is canceled.

Referring back to FIG. 10, upon display of the dialogue 142, the button determination unit 234 determines whether the cancel button 148 is selected (S1008). If it is determined in S1008 the cancel button 148 is selected, the first update process is terminated without updating the paper sheet information stored in association with the tray 44 corresponding to the tray button 118 to which the new paper sheet information has been allocated. On the other hand, if it is determined in S1008 that the cancel button 148 is not selected, it is determined whether or not the allocation change button 144 or 146 is selected (S1010).

Specifically, in S1010, the allocation change button 144 or 146 is determined to be selected only if the button determination unit 234 determines that the allocation change button 144 or the allocation change button 146 is selected. The processing returns to S1008 if it is determined in S1010 that the allocation change button 144 or 146 is not selected. On the other hand, if it is determined in S1010 that the allocation change button 144 or 146 is selected, the paper sheet information stored in association with the tray 44 corresponding to the tray button 118 to which the new paper sheet information has been allocated is updated to the update information (S1012). The specific process content of S1012 is the same as S1004, and description thereof is therefore omitted.

Then, it is determined whether the selected button is the allocation change button 146 (S1014). Specifically, in S1014, the selected button is determined not to be the allocation change button 146 if the button determination unit 234 determined in S1010 that the allocation change button 144 was selected. On the other hand, the selected button is determined to be the allocation change button 146 if the button determination unit 234 determined in S1010 that the allocation change button 146 was selected.

If it is determined in S1014 that the selected button is the allocation change button 146, the tray 44 with the updated paper sheet information is set in the locked state (S1016), and the first update process is terminated. Specifically, in S1016, the restriction unit 223 outputs lock information for setting the tray 44 with the updated paper sheet information in the locked state to the image forming apparatus 12. Based on this lock information, the image forming apparatus 12 sets the tray 44 in the locked state. On the other hand, if it is determined in S1014 that the selected button is not the allocation change button 146, the tray 44 with the updated paper sheet information is set in the unlocked state (S1018), and the first update process is terminated. Specifically, in S1018, the restriction unit 223 outputs lock information for setting the tray 44 with the updated paper sheet information in the unlocked state to the image forming apparatus 12. Based on this lock information, the image forming apparatus 12 sets the tray 44 in the unlocked state.

Second Embodiment

Figure 13:
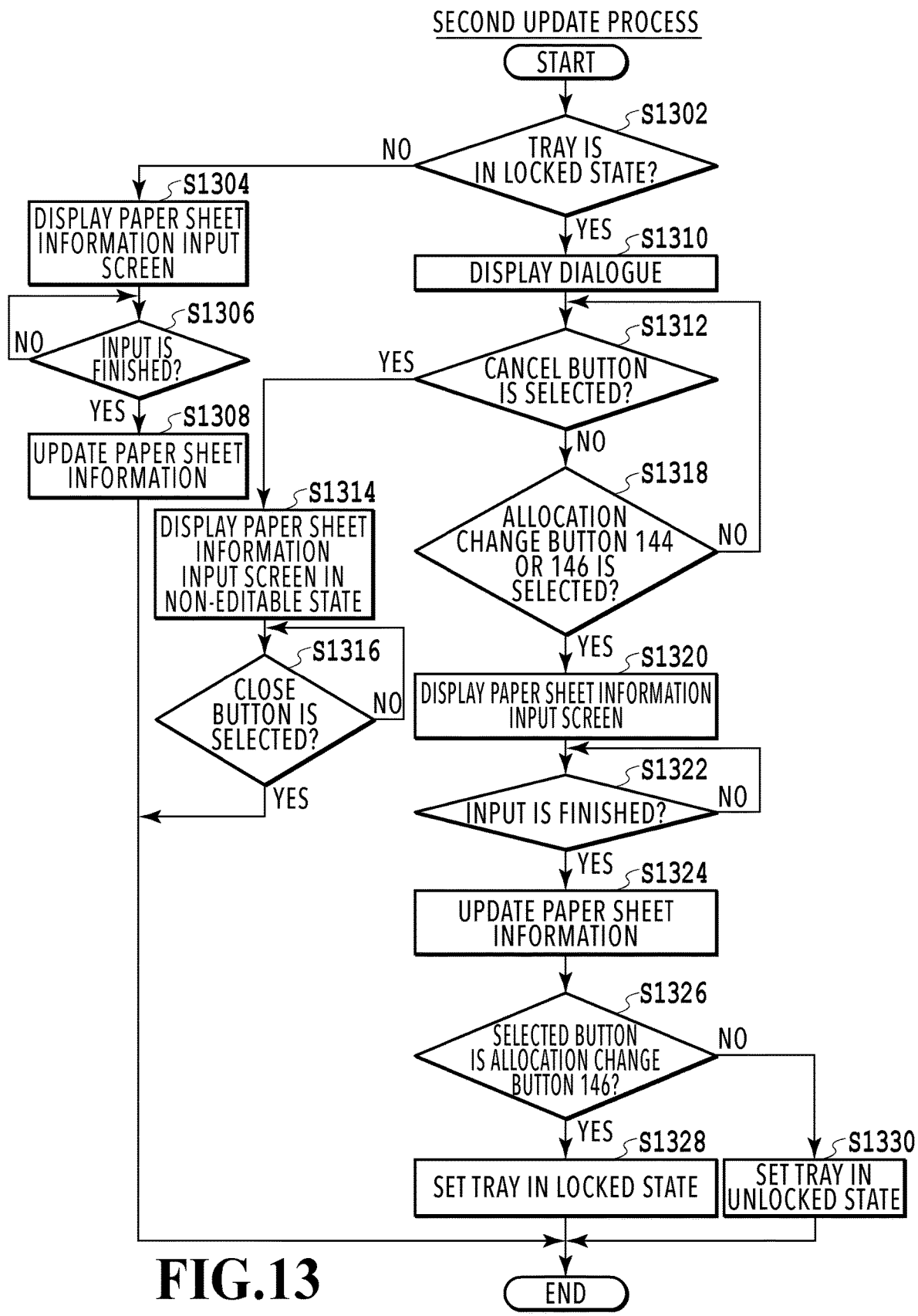
FIG. 13 is a flowchart showing a process routine for a second update process of updating the paper sheet information.

Next, a second embodiment of the printing control apparatus according to the present invention will be described with reference to FIGS. 12 and 13. Note that in the following description, components identical or equivalent to those in the above-described printing system 10 will be designated by the identical reference signs, and detailed description thereof will be omitted as appropriate.

A printing system 200 comprising the printing control apparatus according to the second embodiment differs from the above-described printing system 10 in that the user can directly input attribute information in a paper sheet information input screen as update information.

(Screens Displayed on External Display Apparatus)

In the printing control apparatus 14 in the printing system 200, in the process of S812 in the display process, the screen generation unit 224 generates the device screen 112 and a paper sheet information input screen 150. In this case, the device screen 112 is displayed in the display screen 104. The paper sheet information input screen 150 is a screen which is displayed in a case where a tray button 118 in the device screen 112 is selected and in which the user can directly input attribute information. The paper sheet information input screen 150 is generated for each individual tray 44. Thus, selecting any tray button 118 in the device screen 112 opens the paper sheet information input screen 150 for the tray 44 corresponding to the selected tray button 118.

FIG. 12 is a diagram showing a graphical user interface displayed on the external display apparatus 38. The paper sheet information input screen 150 displayed on the external display apparatus 38 is an input screen for inputting update information being paper sheet information for updating the paper sheet information stored in association with the corresponding tray 44. The paper sheet information input screen 150 is provided with a paper sheet information display area 152 displaying paper sheet information that can be inputted, and a paper sheet list display area 154 displaying a paper sheet list. The paper sheet information input screen 150 is also provided with a plurality of buttons. An allocation button 156 is provided which may be selected to, for example, allocate paper sheet information selected from the list to the tray 44 and thereby update the paper sheet information stored in association with the tray 44. Also, an update button 158 is provided which may be selected to, for example, update the paper sheet information stored in association with the tray 44 to inputted paper sheet information. Further, a close button 160 is provided which may be selected to, for example, close the paper sheet information input screen 150. Furthermore, another information button 162 is provided which may be selected to, for example display a screen that is not displayed.

In the paper sheet information display area 152 are displayed items of attribute information and input boxes corresponding to the items. These input boxes display the pieces of attribute information set for the tray 44. Each input box is either an input box into which a piece of information can be directly inputted or an input box into which a piece of information can be directly inputted and also a piece of information selected from a pull-down menu or the like can be inputted, depending on the item corresponding to the input box.

The paper sheet information display area 152 is provided with an adjustment value display area 164 displaying adjustment items that are adjustable. For each adjustment item displayed in this adjustment value display area 164, a corresponding setting button is displayed. The adjustment items and the setting buttons are displayed based on the adjustment value information in a similar manner to the setting screen in the first embodiment. Note that in a case where the number of adjustment items is so large that not all of the adjustment items can be displayed together in the adjustment value display area 164, a screen for displaying the adjustment items that cannot be displayed is generated and this screen is displayed in response to selecting the other information button 162. After inputting attribute information into the input boxes and inputting information for the adjustment items, the user selects the update button 158. This reflects the inputted information and updates the paper sheet information stored in association with the tray 44.

The attribute information can be inputted by utilizing information displayed in the paper sheet list display area 154. The paper sheet list display area 154 displays a paper sheet list 166 in which sets of paper sheet information on paper sheets that can be stored in association with the tray 44 are listed based on the paper sheet list information. In the present embodiment, in the paper sheet list 166, paper sheet types are displayed next to one another in the height direction, and the pieces of attribute information on each paper sheet are displayed next to one another in the width direction. Thus, to display a paper sheet not displayed in the paper sheet list 166, the user operates a slider bar 168 to scroll the paper sheet list 166 in the height direction. Also, to display a piece of attribute information not displayed in the paper sheet list 166, the user operates a slider bar 170 to scroll the paper sheet list 166 in the width direction.

Selecting a desired paper sheet in the paper sheet list 166 highlights the pieces of paper sheet information on the selected paper sheet, and also displays the pieces of paper sheet information (attribute information) on the selected paper sheet in the input boxes for the corresponding pieces of attribute information displayed in the paper sheet information display area 152. In the state where the user has inputted information into each adjustment item and selected a desired paper sheet in the paper sheet list 166, the user selects the allocation button 156. As a result, the paper sheet information stored in association with the tray 44 is updated to the inputted paper sheet information. Meanwhile, the close button 160 is selected to close to the paper sheet information input screen 150 in a case of terminating operation without changing the paper sheet information displayed in the paper sheet information display area 152 at all.

(Update of Paper Sheet Information)

With the above configuration, in response to selection of a tray button 118 in the device screen 112 by the user, the reception unit 236 receives an update instruction to update the paper sheet information stored in association with the corresponding tray 44. Then, a second update process of updating the paper sheet information stored in association with the tray 44 to update information is started. FIG. 13 is a flowchart showing a detailed process content of the second update process. The CPU 80 executes the series of processes shown in the flowchart of the update process by deploying a program stored in the storage apparatus 86 (or the ROM 82) to the RAM 84 and executing it. Alternatively, the functions of some or all of the steps in FIG. 13 may be implemented with hardware such as an ASIC or an electronic circuit.

Upon start of the second update process, firstly, the lock determination unit 232 determines whether the tray 44 corresponding to the selected tray button 118 is in the locked state (S1302). If it is determined in S1302 that the tray 44 corresponding to the selected tray button 118 is not in the locked state, the display control unit 230 displays the paper sheet information input screen 150 in an editable state on the external display apparatus 38 (S1304). It is then determined whether input by the user is finished (S1306). If it is determined that input is finished, the paper sheet information stored in association with the tray 44 is updated to the paper sheet information edited in the paper sheet information input screen 150, i.e., update information (S1308). The second update process is then terminated.

Specifically, in S1306, it is determined that input by the user is finished in a case where the allocation button 156, the update button 158, or the close button 160 is selected. Here, the reception unit 236 also receives the paper sheet information edited (inputted) in the paper sheet information input screen 150 as the update information for updating the paper sheet information stored in association with the tray 44. In S1308, the update information received by the reception unit 236 is outputted to the image forming apparatus 12 in the case where the allocation button 156 or the update button 158 is selected. Here, information identifying the tray 44 whose paper sheet information is to be updated is outputted as well. Upon input of these pieces of information to the image forming apparatus 12, the storage unit 214 in the image forming apparatus 12 identifies the tray 44 whose paper sheet information is to be updated based on the inputted pieces of information. Then, the storage unit 214 updates the paper sheet information stored in association with the identified tray 44 to the update information. Also, in S1308, the update of the paper sheet information associated with the tray 44 is canceled in the case where the close button 160 is selected.

On the other hand, if it is determined in S1302 that the tray 44 corresponding to the selected tray button 118 is in the locked state, the display control unit 230 displays the dialogue 142 on the external display apparatus 38 (S1310). The dialogue 142 is displayed to have the user recognize that the tray 44 corresponding to the selected tray button 118 is in the locked state, and also have the user select whether to update the paper sheet information stored in association with the tray 44 to the update information. Upon display of the dialogue 142, the button determination unit 234 determines whether the cancel button 148 is selected (S1312). If it is determined in S1312 that the cancel button 148 is selected, the display control unit 230 displays the paper sheet information input screen 150 in a non-editable state on the external display apparatus 38 (S1314). For example, the paper sheet information input screen 150 is displayed in a state where the information in the paper sheet information display area 152 cannot be edited. It is then determined whether the close button 160 is selected (S1316). If the close button 160 is selected, the second update process is terminated without updating the paper sheet information. Specifically, in this case, the second update process is terminated without updating the paper sheet information stored in association with the tray 44.

On the other hand, if it is determined in S1312 that the cancel button 148 is not selected, it is determined whether or not the allocation change button 144 or 146 is selected (S1318). The specific process content of S1318 is the same as S1010, and description thereof is therefore omitted. The processing returns to S1312 if it is determined in S1318 that the allocation change button 144 or 146 is not selected. If it is determined in S1318 that the allocation change button 144 or 146 is selected, the display control unit 230 displays the paper sheet information input screen 150 in an editable state on the external display apparatus 38 (S1320). It is then determined whether input by the user is finished (S1322). If it is determined that input is finished, the paper sheet information stored in association with the tray 44 is updated to the paper sheet information edited in the paper sheet information input screen 150 (update information) (S1324). The specific process contents of S1322 and S1324 are the same as S1306 and S1308, and description thereof is therefore omitted.

Then, it is determined whether the selected button is the allocation change button 146 (S1326). The specific process content of S1326 is the same as S1014, and description thereof is therefore omitted. If it is determined in S1326 that the selected button is the allocation change button 146, the tray 44 whose paper sheet information has been updated to the update information is set in the locked state (S1328), and the second update process is terminated. On the other hand, if it is determined in S1326 that the selected button is not the allocation change button 146, the tray 44 whose paper sheet information has been updated to the update information is set in the unlocked state (S1330), and the second update process is terminated. The specific process contents of S1328 and S1330 are the same as S1016 and S1018, and description thereof is therefore omitted.

As described above, in the printing systems 10 and 200, in a case where a paper sheet information update process is performed on a tray 44 in the locked state, the dialogue 142 is displayed, which has the user select whether to update the paper sheet information associated with the tray 44. Then, if the user selects to update the paper sheet information, the paper sheet information associated with the tray 44 is updated based on the inputted update information. Also, for the tray 44 after the update of the paper sheet information, the dialogue 142 allows the user to select whether to restrict subsequent update of the paper sheet information or to disable the restriction. Then, lock information for setting the tray 44 after the update of the paper sheet information in the locked state is set if the user selects to restrict update of the paper sheet information. On the other hand, lock information for setting the tray 44 after the update of the paper sheet information in the unlocked state is set if the user selects to disable the restriction on update of the paper sheet information.

Thus, in the printing systems 10 and 200, the user can update the paper sheet information stored in association with a tray 44 without releasing the tray 44 from the locked state. In this manner, the work of updating the paper sheet information associated with a tray 44 is executed efficiently. Also, the tray 44 after the update can be set in the locked state or the unlocked state. This simplifies the setting work for restriction on update of the paper sheet information. Further, even if a user who is not well experienced with these works perform the work of updating the paper sheet information, the user can easily update the paper sheet information associated with a tray under restriction of update, and easily restrict subsequent update of the paper sheet information.

Other Embodiments

Note that the above embodiments may be modified as described in (1) to (6) below.

Figures 14A, 14B:
FIGS. 14A and 14B are diagrams showing modifications of the dialogue.

(1) Though not particularly described in the above embodiments, in the case of selecting any of the lock buttons 138-1 to 138-8 to set the corresponding tray 44 in the locked state, a dialogue 172 may be displayed into which a reason for setting the tray 44 in the locked state can be inputted, as shown in FIG. 14A. The dialogue 172 displays a message that prompts the user to input a reason for setting the tray 44 in the locked state, specifically, a reason for restricting update of the paper sheet information, and also is provided with an input box 174 in which to input the reason. The dialogue 172 (second user interface) is also provided with an OK button 176 and a cancel button 178. Selecting the OK button 176 saves the information inputted in the input box 174 and closes the dialogue 172. Selecting the cancel button 178 closes the dialogue 172 without saving the information inputted in the input box 174. Meanwhile, whether or not to display the dialogue 172 may be switched in the screen for configuring various settings of the application that is opened with the setting button 134, for example. It is also possible to display fixed phrases that can be reasons for setting the tray 44 in the locked state in the form of a menu over the input box 174 and have the user select one.

Then, in this case, in the first update process and the second update process, the information inputted in the input box 174 in the dialogue 172 (the reason for setting the tray 44 in the locked state) is displayed in the dialogue 142, which is displayed in the case where the tray 44 is in the locked state (see FIG. 14B). In this manner, a user can recognize the reason for setting the tray 44 in the locked state and easily determine whether the user should or should not update the paper sheet information. The configuration may be such that a user name can be inputted in the input box 174 in the dialogue 172 and the name of the user who has set the tray 44 in the locked state may be displayed in the dialogue 142 along with the reason for setting the tray 44 in the locked state.

(2) Though not particularly described in the above embodiments, the printing systems may be configured to be capable of selectively executing the first update process or the second update process. Also, in the above embodiments, a graphical user interface for having the user select whether to update the paper sheet information stored in association with a tray 44 to update information (dialogue 142) is presented. Specifically, the display control unit 230 functions as a presenting unit that presents the dialogue 142, and presents the dialogue 142. However, the user interface for having the user select whether to update the paper sheet information stored in association with a tray 44 to update information is not limited to the dialogue 142. Specifically, a user interface that uses audio to have the user select whether to update the paper sheet information stored in association with a tray 44 to update information, i.e., a voice user interface, may be presented.

(3) In the above embodiments, the allocation change buttons 144 and 146 and the cancel button 148 are displayed in the dialogue 142 for having the user select whether to update the paper sheet information stored in association with a tray 44 to update information, but the configuration is not limited to this. Specifically, a single allocation change button and the cancel button 148 may be displayed in the dialogue 142 and, in a case where the allocation change button is selected, a dialogue allowing the user to select whether to set the tray 44 in the locked state or in the unlocked state may be displayed to have the user make a choice.

(4) Though not particularly described in the above embodiments, in a case where a tray 44 has no paper sheet information stored in association therewith, paper sheet information may be set via the display screen 104 and the paper sheet information input screen 150, that is, paper sheet information may be stored in association with the tray 44. Alternatively, paper sheet information may be set for the tray 44 via the client computer 16 or the operation unit 28.

(5) Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

(6) The above embodiments and the above various configurations described in (1) to (5) may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-026653, filed Feb. 18, 2019, which is hereby incorporated by reference wherein in its entirety.

What is claimed is:

1. A sheet information changing apparatus, comprising:
a user interface that receives a changing instruction for changing sheet information of a sheet holder of a printing apparatus; and
a controller that changes the sheet information of the sheet holder based on the changing instruction received by the user interface,
wherein the controller restricts change of the sheet information of the sheet holder based on a user instruction,
wherein, based on reception of the changing instruction for changing the sheet information of which change is restricted, the controller causes a display to display a confirming screen for confirming whether to change the sheet information of which change is restricted,
wherein, based on reception of an instruction for changing the sheet information via the confirming screen, the controller changes the sheet information of which change is restricted,
wherein the user interface further receives whether to keep, after the reception of the instruction for changing the sheet information of the sheet holder via the confirming screen, a state that the change is restricted,
wherein, in a case where the user interface receives to keep the state, the controller keeps, after the reception of the instruction for changing the sheet information of which the change is restricted via the confirming screen, the state that the sheet holder is restricted, and
wherein, in a case where the user interface receives not to keep the state, the controller releases, after the reception of the instruction for changing the sheet information of which the change is restricted via the confirming screen, the state that the sheet holder is restricted.

2. The sheet information changing apparatus according to claim 1, wherein the user interface further receives another sheet information, and
wherein the controller changes the sheet information of which change is restricted to the another sheet information based on the changing instruction received by the user interface.

3. The sheet information changing apparatus according to claim 1, wherein the controller does not change the sheet information based on reception of an instruction not to change the sheet information of the sheet holder via the confirming screen.

4. The sheet information changing according to claim 1, wherein the user interface receives a reason of restriction when change of the sheet information of the sheet holder is restricted.

5. The sheet information changing apparatus according to claim 4, wherein the user interface displays the reason of the restriction when the controller restricts change of the sheet information of the sheet holder.

6. The sheet information changing apparatus according to claim 1, wherein the user interface selects a sheet holder from among a plurality of sheet holders,
wherein the user interface receives the changing instruction for changing sheet information of the sheet holder selected by the user interface, and
wherein the controller changes the sheet information of the sheet holder selected by the user interface based on the changing instruction received by the user interface.

7. The sheet information changing apparatus according to claim 1, wherein
the user interface selects a sheet holder from among a plurality of sheet holders, and
wherein the controller restricts change of the sheet information of the sheet holder selected by the user interface.

8. A method of changing a sheet information changing apparatus including a user interface that receives a changing instruction for changing sheet information of a sheet holder of a printing apparatus while changing the sheet information of the sheet holder based on the changing instruction received by the user interface and restricting change of the sheet information of the sheet holder based on a user instruction, the method comprising:
causing a display to display a confirming screen for confirming whether to change the sheet information of which change is restricted, based on reception of the changing instruction for changing the sheet information of which change is restricted;

changing the sheet information of which change is restricted, based on reception of an instruction for changing the sheet information via the confirming screen;

receiving, by the user interface, whether to keep, after the reception of the instruction for changing the sheet information of the sheet holder via the confirming screen, a state that the change is restricted;

in a case where it is received by the user interface to keep the state, keeping, after the reception of the instruction for changing the sheet information of which the change is restricted via the confirming screen, the state that the sheet holder is restricted; and in a case where it is received by the user interface not to keep the state, releasing, after the reception of the instruction for changing the sheet information of which the change is restricted via the confirming screen, the state that the sheet holder is restricted.

9. A non-transitory computer readable storage medium storing a program for causing a computer to perform a method of changing a sheet information changing apparatus including a user interface that receives a changing instruction for changing sheet information of a sheet holder of a printing apparatus while changing the sheet information of the sheet holder based on the changing instruction received by the user interface and restricting change of the sheet information of the sheet holder based on a user instruction, the method comprising:

causing a display to display a confirming screen for confirming whether to change the sheet information of which change is restricted, based on reception of the changing instruction for changing the sheet information of which change is restricted;

changing the sheet information of which change is restricted, based on reception of an instruction for changing the sheet information via the confirming screen;

receiving, by the user interface, whether to keep, after the reception of the instruction for changing the sheet information of the sheet holder via the confirming screen, a state that the change is restricted;

in a case where it is received by the user interface to keep the state, keeping, after the reception of the instruction for changing the sheet information of which the change is restricted via the confirming screen, the state that the sheet holder is restricted; and in a case where it is received by the user interface not to keep the state, releasing, after the reception of the instruction for changing the sheet information of which the change is restricted via the confirming screen, the state that the sheet holder is restricted.

10. A sheet information changing system, comprising:

a user interface that receives a changing instruction for changing sheet information of a sheet holder; and a controller that changes the sheet information of the sheet holder based on the changing instruction received by the user interface, wherein the controller restricts change of the sheet information of the sheet holder based on a user instruction, wherein, based on reception of the changing instruction for changing the sheet information of which change is restricted, the controller causes a display to display a confirming screen for confirming whether to change the sheet information of which change is restricted, wherein, based on reception of an instruction for changing the sheet information via the confirming screen, the controller changes the sheet information of which change is restricted, wherein the user interface further receives whether to keep, after the reception of the instruction for changing the sheet information of the sheet holder via the confirming screen, a state that the change is restricted, wherein, in a case where the user interface receives to keep the state, the controller keeps, after the reception of the instruction for changing the sheet information of which the change is restricted via the confirming screen, the state that the sheet holder is restricted, and wherein, in a case where the user interface receives not to keep the state, the controller releases, after the reception of the instruction for changing the sheet information of which the change is restricted via the confirming screen, the state that the sheet holder is restricted.

\* \* \* \* \*